(12) United States Patent  (10) Patent No.: US 7,023,536 B2
Zhang et al.  (45) Date of Patent: Apr. 4, 2006

(54) APPARATUS AND METHOD FOR DETERMINING ORIENTATION PARAMETERS OF AN ELONGATE OBJECT

(75) Inventors: Guanghua G. Zhang, San Jose, CA (US); Dale H. Buermann, Los Altos, CA (US); Michael J. Mandella, Palo Alto, CA (US); Hector H. Gonzalez-Banos, Mountain View, CA (US); Stewart R. Carl, Palo Alto, CA (US)

(73) Assignee: Electronic Scripting Products, Inc., Palo Alto, CA (US)

( * ) Notice: Subject to any disclaimer, the term of this patent is extended or adjusted under 35 U.S.C. 154(b) by 87 days.

(21) Appl. No.: 10/796,236

(22) Filed: Mar. 8, 2004

(65) Prior Publication Data

US 2005/0195387 A1  Sep. 8, 2005

(51) Int. Cl.
    *G01B 11/26* (2006.01)
(52) U.S. Cl. .................................................... 356/138
(58) Field of Classification Search ................ 250/221; 356/153, 623
    See application file for complete search history.

(56) References Cited

U.S. PATENT DOCUMENTS

| 5,166,668 | A | 11/1992 | Aoyagi |
| 5,239,489 | A | 8/1993 | Russell |
| 5,434,371 | A | 7/1995 | Brooks |
| 5,764,611 | A | 6/1998 | Watanabe |
| 5,786,804 | A | 7/1998 | Gordon |

(Continued)

OTHER PUBLICATIONS

Ait-Aider et al., "Adaptation of Lowe's Camera Pose Recovery Algorithm to Mobile Robot Self-Localisation", Robotica 2002.

(Continued)

*Primary Examiner*—Gregory J. Toatley, Jr.
*Assistant Examiner*—Isiaka O. Akanbi
(74) *Attorney, Agent, or Firm*—Lumen Intellectual Property Services, Inc.

(57) ABSTRACT

An apparatus and method employing principles of stereo vision for determining one or more orientation parameters and especially the second and third Euler angles θ, ψ of an elongate object whose tip is contacting a surface at a contact point. The apparatus has a projector mounted on the elongate object for illuminating the surface with a probe radiation in a known pattern from a first point of view and a detector mounted on the elongate object for detecting a scattered portion of the probe radiation returning from the surface to the elongate object from a second point of view. The orientation parameters are determined from a difference between the projected and detected probe radiation such as the difference between the shape of the feature produced by the projected probe radiation and the shape of the feature detected by the detector. The pattern of probe radiation is chosen to provide information for determination of the one or more orientation parameters and can include asymmetric patterns such as lines, ellipses, rectangles, polygons or the symmetric cases including circles, squares and regular polygons. To produce the patterns the projector can use a scanning arrangement or a structured light optic such as a holographic, diffractive, refractive or reflective element and any combinations thereof. The apparatus is suitable for determining the orientation of a jotting implement such as a pen, pencil or stylus.

37 Claims, 12 Drawing Sheets

U.S. PATENT DOCUMENTS

| | | | |
|---|---|---|---|
| 5,850,058 | A | 12/1998 | Tano et al. |
| 5,902,968 | A | 5/1999 | Sato et al. |
| 5,959,617 | A | 9/1999 | Bird et al. |
| 5,977,958 | A | 11/1999 | Baron et al. |
| 5,981,884 | A | 11/1999 | Sato et al. |
| 6,023,291 | A | 2/2000 | Kamel et al. |
| 6,033,086 | A | 3/2000 | Bohn |
| 6,034,716 | A | 3/2000 | Whiting et al. |
| 6,057,909 | A | 5/2000 | Yahav et al. |
| 6,081,261 | A | 6/2000 | Wolff et al. |
| 6,181,329 | B1 | 1/2001 | Stork et al. |
| 6,212,296 | B1 | 4/2001 | Stork et al. |
| 6,249,274 | B1 | 6/2001 | Svancarek et al. |
| 6,291,829 | B1 | 9/2001 | Allen et al. |
| 6,330,057 | B1 | 12/2001 | Lederer et al. |
| 6,424,407 | B1 | 7/2002 | Kinrot et al. |
| 6,492,981 | B1 | 12/2002 | Stork et al. |
| 6,493,032 | B1 | 12/2002 | Wallerstein et al. |
| 6,556,190 | B1 | 4/2003 | Fleck et al. |
| 6,583,869 | B1 * | 6/2003 | Sheridan ................. 356/153 |
| 6,592,039 | B1 | 7/2003 | Smith et al. |
| 6,627,870 | B1 | 9/2003 | Lapstun et al. |
| 6,639,685 | B1 | 10/2003 | Gu et al. |
| 6,650,320 | B1 | 11/2003 | Zimmerman |
| 6,686,579 | B1 | 2/2004 | Fagin et al. |
| 6,741,364 | B1 * | 5/2004 | Lange et al. ............. 356/622 |
| 2002/0001029 | A1 | 1/2002 | Abe |
| 2002/0048404 | A1 | 4/2002 | Fahraeus et al. |
| 2002/0141616 | A1 | 10/2002 | Cox et al. |
| 2002/0148655 | A1 | 10/2002 | Cho et al. |
| 2002/0180714 | A1 | 12/2002 | Duret |
| 2003/0025951 | A1 | 2/2003 | Pollard et al. |
| 2003/0029919 | A1 | 2/2003 | Lynggaard et al. |
| 2003/0034961 | A1 | 2/2003 | Kao |
| 2003/0063200 | A1 | 4/2003 | Isoyama |
| 2003/0195820 | A1 | 10/2003 | Silverbrook et al. |

OTHER PUBLICATIONS

Ait-Aider et al., "Model to Image Straight Line Matching Method for Vision-Based Indoor Mobile Robot Self-Location", IROS 2002, Lausanne, Sep. 30-Oct. 4.

Ansar et al., "Linear Pose Estimation from Points or Lines", ECCV 2002, LNCS 2353, pp. 282-296, Springer-Verlag Berlin Heidelberg 2002.

Batista et al., "Pose View Stability Analysis for Camera Look Angles Computation", Institute of Systems and Robotics—Dep. of Elec. Engineering, Univ. of Coimbra, Portugal.

Faugeras, Three-Dimensional Computer Vision: A Geometric Viewpoint, Cambridge, MA: MIT Press 1993. ISBN 262-06158-9.

Goldstein, et al., Classical Mechanics, 3rd Edition, Addison Wesley 2002.

Schramm et al., "Computer Graphic Simulation of Light Reflection from Paper", IS&T PICS Conference, 1998, pp. 412-423.

Schroering et al., "A New Input Device for 3D Sketching", Washington University in St. Louis.

Shrikhande and Stockmam, "Surface Orientation from a Projection Grid", PAMI (11), No. 6, Jun. 1989, pp. 650-655.

Trucco, Emanuele, Verri, Alessandro, Introductory Techniques for 3-D Computer Vision, New York: Prentice Hall 1998. ISBN 0-13-261108-2.

Ude, "Nonlinear Least Squares Optimisation of Unit Quaternion Functions for Pose Estimation from Corresponding Features", Conf. Pattern Recognition, Brisbane, pp425-427 Aug. 1998.

Wang et al., "Computation of Surface Orientation and Structure of Objects Using Grid Coding", PAMI (9), No. 1, Jan. 1987, pp. 129-137.

* cited by examiner

APPARATUS AND METHOD FOR DETERMINING ORIENTATION PARAMETERS OF AN ELONGATE OBJECT

FIELD OF THE INVENTION

The present invention relates generally to determining one or more orientation parameters of an elongate object whose tip is contacting a surface.

BACKGROUND OF THE INVENTION

When an object moves with respect to stationary references such as a ground plane, fixed points, lines or reference surfaces, knowledge of the object's inclination with respect to these references can be used to derive a variety of its parameters of motion. In fact, inclination of the object with respect to a reference is usually required for navigating the object or obtaining information about its trajectory. Over time, many useful coordinate systems and methods have been developed to parameterize the equations motion of such objects. For a theoretical background the reader is referred to textbooks on classical mechanics such as Goldstein et al., Classical Mechanics, $3^{rd}$ Edition, Addison Wesley 2002. For general examples of object tracking and inclination measurements a few examples can be found in U.S. Pat. No. 5,786,804 to Gordon and U.S. Pat. No. 6,023,291 to Kamel et al. as well as the references cited therein.

In one specific field of navigation it is important to know the inclination of an elongate object while it is in contact with a plane surface. Usually, inclination is defined with reference to an axis of the object that passes through the point of contact with the plane surface. In some cases, this axis is also the centerline of the elongate object. Various types of elongate objects can benefit from knowledge of their inclination while in contact with a plane surface. These objects include walking canes when in touch with the ground, pointers when in touch with a display or projection surface, writing devices when in touch with a writing surface, and styluses when in touch with an input screen.

The need to determine inclination is deeply felt in the field of input devices such as pens and styluses. Here, inclination has to be known in order to analyze the information written or traced by the user. In principle, many methods can be adapted to measure pen inclination. Such methods can employ ranging devices using ultrasound, electromagnetic radiation including visible light and other apparatus. For example, U.S. Pat. No. 5,166,668 teaches a 3-axis detection method, U.S. Pat. No. 5,977,958 teaches a method using a difference in the time-of-flight of an electromagnetic wave and still other references teach to apply the time-of-flight method to microwaves. Still other approaches use calibration marks, e.g., as described in U.S. Pat. Appl. 2003/0025951 or entire auxiliary calibration systems as described in U.S. Pat. Appl. 2002/0141616. Still another method for measuring the inclination of a pen with respect to the vertical employs sensors mounted in the pen for measuring magnetic fields created by magnetic dipoles and oriented perpendicular to a writing board as described in U.S. Pat. Appl. 2002/0180714. Unfortunately, all of these methods are cumbersome and limiting to the user because the signals sent from the pen have to be received by external devices. In other words, the pen cannot determine its inclination independently with on-board equipment.

Clearly, it is desirable to have pen and stylus input devices that can determine their inclination independently with their own on-board equipment. In principle, pens using inertial sensors such as gyroscopes and accelerometers can be designed to derive their inclination without external devices. Japan patent application 6-67,799 proposes a method using a 2-axis acceleration sensor and the inclination angle is determined by integrating the angular velocity of the pen. Also of interest are U.S. Pat. Nos. 5,902,968; 5,981,884 using a 3-axis acceleration sensor and a 3-axis gyroscope. U.S. Pat. No. 5,434,371 teaches a structure in which an acceleration sensor is attached to the tip of a pen such to thus compensate the error due to pen inclination and a signal processing portion is located at the upper portion of the pen.

Unfortunately, inertial sensors suffer from drift errors and accumulation errors that typically increase as time squared for accelerometers and linearly with time for gyroscopes. To overcome these limitations of inertial sensors US Pat. Appl. No. 2002/0148655 to Cho et al. teaches the use of an optical 3-dimensional detecting device for detecting orientation angles of a centerline of an electronic pen relative to a ground and a height of the pen over a writing surface. Meanwhile, a 3-axis accelerometer is used for detecting movement of the pen. The optical device has a portion such as a light source for radiating a beam to the writing surface to form beam spots and a detecting portion such as a camera and corresponding optics for detecting the beam spots from the light reflected off the writing surface.

Although Cho's teaching goes far to solve the problems, it still lacks the versatility, efficiency and accuracy to be employed in determining orientation parameters of writing devices and elongate objects in general.

OBJECTS AND ADVANTAGES

In view of the shortcomings of the prior art, it is the object of the invention to provide an apparatus and method for determining one or more orientation parameters of an elongate object. The orientation parameter can be an inclination angle and the method can be applied to elongate object such as canes, pointers, robotic arms and jotting implements such as pens, pencils or styluses when in contact with a plane surface. More specifically, it is an object of the invention to provide an apparatus and method to obtain the inclination angle θ between a normal to the plane surface and an axis of the elongate object, e.g., the center axis of the object and a roll angle ψ around the axis.

It is another object of the invention to ensure that the apparatus is small and compatible with a self-contained jotting implement, such as a pen, pencil or stylus.

These and numerous other advantages will become apparent upon reading the detailed description in conjunction with the drawing figures.

SUMMARY OF THE INVENTION

The present invention provides an apparatus for determining one or more orientation parameters of an elongate object whose tip is contacting a surface at a contact point. The apparatus has a projector mounted on the elongate object for illuminating the surface with a probe radiation in a known pattern from a first point of view. A detector is mounted on the elongate object at a second point of view, distinct from the first point of view, for detecting a scattered portion of the probe radiation returning from the surface to the elongate object. The apparatus also has a unit for determining the orientation parameter or parameters from a difference between the projected and detected probe radiation. More precisely, the difference is established between the feature produced by the projected probe radiation and the feature as detected by the detector. In other words, this difference exists between the known pattern of probe radiation producing a feature on the surface and the pattern detected in the scattered portion returning from the surface.

The orientation parameters can include any angles used to determine the orientation of the elongate object with respect to the surface. One useful orientation parameter is an inclination angle θ between an axis of the elongate object, e.g., the center axis, and a normal to the surface at the contact point. In this case, inclination angle θ is the second Euler angle. Another useful orientation parameter is a roll angle ψ defined around the axis of the elongate object. Note that roll angle ψ is the third Euler angle.

The pattern of probe radiation produced by the projector is chosen to provide information upon scattering from the surface sufficient to determine the one or more orientation parameters. For example, the pattern of probe radiation forms an asymmetric pattern such as a set of lines, ellipse, rectangle or polygon. It is understood that the special cases of features such as circles, squares and regular polygons are included. To produce the required patterns the projector can use a structured light optic such as a holographic element, a diffractive element, a refractive element, a reflective element and any combinations thereof.

In a preferred embodiment, the elongate object is a jotting implement such as a pen, pencil or stylus. Alternatively, the elongate object can be a pointer, cane, robotic arm or any other elongate object standing to benefit from knowledge of one or more of its orientation parameters.

In another embodiment the apparatus is designed for use when the elongate object is situated on a plane surface and the orientation parameter is at least one orientation parameter, such as inclination angle θ between the axis of the object and a normal to the surface. Here, the projector illuminates the plane surface with probe radiation at a known angle σ with respect to the axis of the elongate object. The detector detects the scattered portion returning from the surface at a certain scatter angle τ with respect to the axis of the elongate object. A timing unit derives the inclination angle θ from a detection time of the scattered portion and known projection time of the probe radiation. Note that the inclination angle θ is equivalent to the second Euler angle.

In this embodiment it is preferable to vary angle σ. This can be accomplished with a scanning arrangement that varies angle σ in a scan pattern. For example, the scanning arrangement is a uniaxial scanner for varying angle σ by introducing an x-deflection $\gamma_x$. Alternatively, the scanning arrangement is a biaxial scanner for varying angle σ by introducing an x-deflection $\gamma_x$ and a y-deflection $\gamma_y$. When using a biaxial scanner the scan pattern can be a raster scan pattern, line scan pattern or a Lissajous figure.

In still another alternative embodiment, the projector has a structured light optic for projecting the probe radiation onto the plane surface in a known pattern. Suitable structured light optics include holographic elements, diffractive elements, refractive elements as well as reflective elements. Suitable patterns include line sets, ellipses, rectangles and polygons, including the special cases of line grids, circles, squares and regular polygons.

The projector is mounted above or below the detector, as convenient. In order to select scattered portion at scatter angle τ the detector has a narrow field angle reception unit for admitting to the detector only scattered portion returning from the plane surface at scatter angle τ. The narrow field angle reception unit can be any suitable element such as a cylindrical lens, a collimating lens, a thick aperture, a system of apertures or a slit. The detector can be photodetector array, i.e., an array of photosensitive pixels. In this case it is convenient for the apparatus to also have a centroid computation unit for determining a centroid of the scattered portion received at scatter angle τ.

In a preferred embodiment the probe radiation is shaped into a scan beam with the aid of a suitable optic. In some cases the optic can shape the probe radiation into a number of scan beams. Also, the timing unit is mounted on the elongate object and the projector uses a single frequency emitter for emitting the probe radiation at a single frequency f. For example, the emitter is a laser, e.g., a laser diode or a vertical cavity surface emitting laser (VCSEL).

The method of the invention can be used to determine at least one orientation parameter of an elongate object when its tip is contacting a surface at a contact point. The method calls for illuminating the surface with a probe radiation in a known pattern, e.g., an asymmetric pattern or a scan pattern tracing out a predetermined feature, from a first point of view on the elongate object. The method also calls for collecting or detecting a scattered portion of the probe radiation at a second point of view on the elongate object. The one or more orientation parameters, i.e., the second and third Euler angles θ, ψ, are determined from a difference between the probe radiation and the scattered portion. This method can be used when the surface is a plane surface or has a non-planar geometry.

There is another method of the invention for determining at least one orientation parameter, such as inclination angle θ, when the elongate object is operated on a plane surface. In this method, the plane surface is illuminated by the probe radiation at a known angle σ with respect to an object axis and a scattered portion of the probe radiation returning to the object is detected at a known angle τ with respect to the axis of the elongate object. A timing unit is used for deriving the at least one orientation parameter, e.g., the inclination angle θ from a detection time of the scattered portion and a projection time of the probe radiation. In this method it is preferable to vary angle σ in a scan pattern, e.g., a uniaxial or a biaxial scan pattern.

The details of the invention will now be described in detail with reference to the drawing figures.

DETAILED DESCRIPTION

Figure 1A:
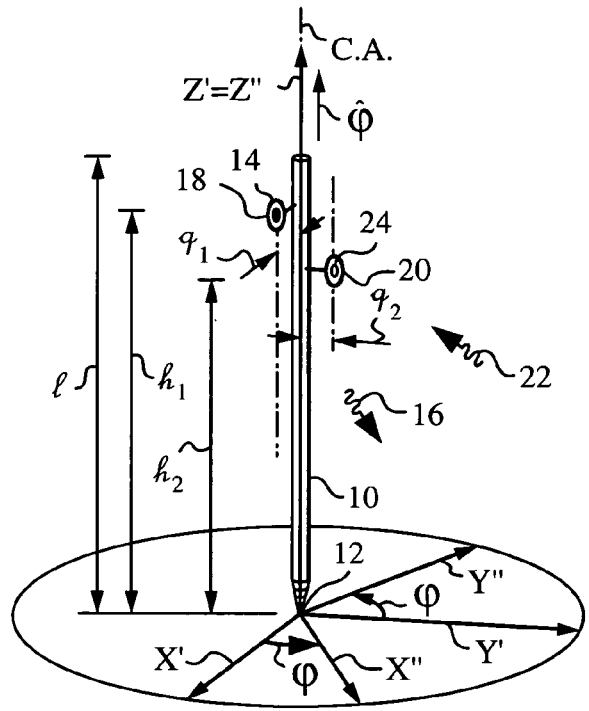
FIGS. 1A–C are diagrams illustrating Euler rotations of an elongate object.

The present invention will be best understood by initially reviewing Euler rotations as used herein to describe the pose of an elongate object 10. The pose includes position and spatial orientation of elongate object 10. FIG. 1A illustrates object 10 of length l with a tip 12 at the origin of non-rotated object coordinates $(X',Y',Z')$. An axis of object 10, in the present embodiment a central axis or center axis denoted by C.A. is collinear with the $Z'$ axis. Axis C.A. passes through tip 12 and the origin of non-rotated object coordinates $(X',Y',Z')$. A projector 14 is mounted on object 10 for projecting a probe radiation 16 in a known pattern. Projector 14 projects radiation 16 from a first point of view 18 in plane $(X'-Z')$ at a height $h_1$ at and an offset distance $q_1$ from axis C.A. A detector 20 is mounted below projector 14 on object 10 for collecting or detecting a scattered portion 22 of probe radiation 16 returning to object 10. Detector detects scattered portion 22 at a second point of view 24 in plane $(Y'-Z')$ at a height $h_2$ and at an offset distance $q_2$ from axis C.A. Of course, in general points of view 18, 24 need not be contained in perpendicular planes.

A person skilled in the art will appreciate that many conventions exist for rotating object 10. In the system chosen herein object 10 is rotated from initial upright position together with object coordinates to visualize the rotation convention. Detector 20 is initially aligned with the $Y'$ axis.

FIG. 1A illustrates a first counterclockwise rotation by first Euler angle $\phi$ of object coordinates $(X',Y',Z')$ about the $Z'$ axis. This rotation of the object coordinates does not affect the $Z'$ axis so once rotated $Z''$ axis is collinear with non-rotated $Z'$ axis ($Z''=Z'$). On the other hand, axes $X'$ and $Y'$ are rotated by first Euler angle $\phi$ to yield once rotated axes $X''$ and $Y''$.

Figure 1B:
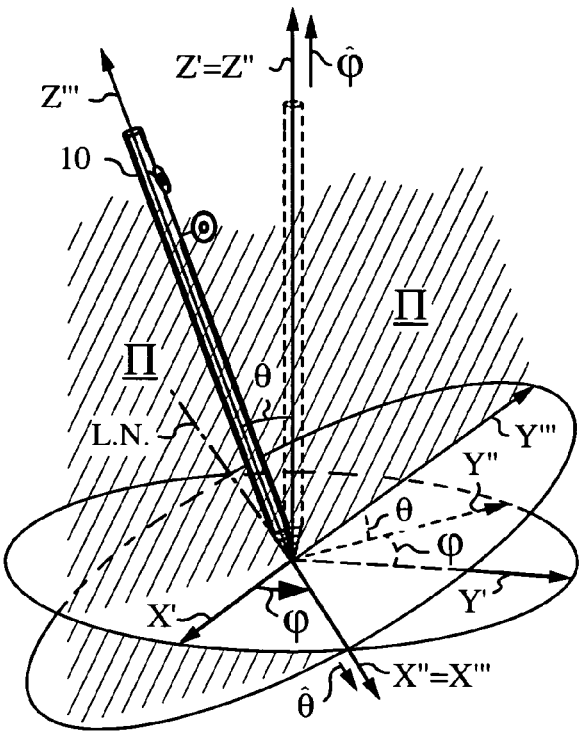

FIG. 1B illustrates a second counterclockwise rotation by second Euler angle $\theta$ applied to once rotated object coordinates $(X'',Y'',Z'')$. This second rotation is performed about the once rotated $X''$ axis and therefore it does not affect the $X''$ axis ($X'''=X''$). On the other hand, axes $Y''$ and $Z''$ are rotated by second Euler angle $\theta$ to yield twice rotated axes $Y'''$ and $Z'''$. This second rotation is performed in a plane $\Pi$ containing once rotated axes $Y''$, $Z''$ and twice rotated axes $Y'''$, $Z'''$. Note that axis C.A. of object 10 is rotated counterclockwise by second Euler angle $\theta$ in plane $\Pi$ and remains collinear with twice rotated axis $Z'''$.

Figure 1C:
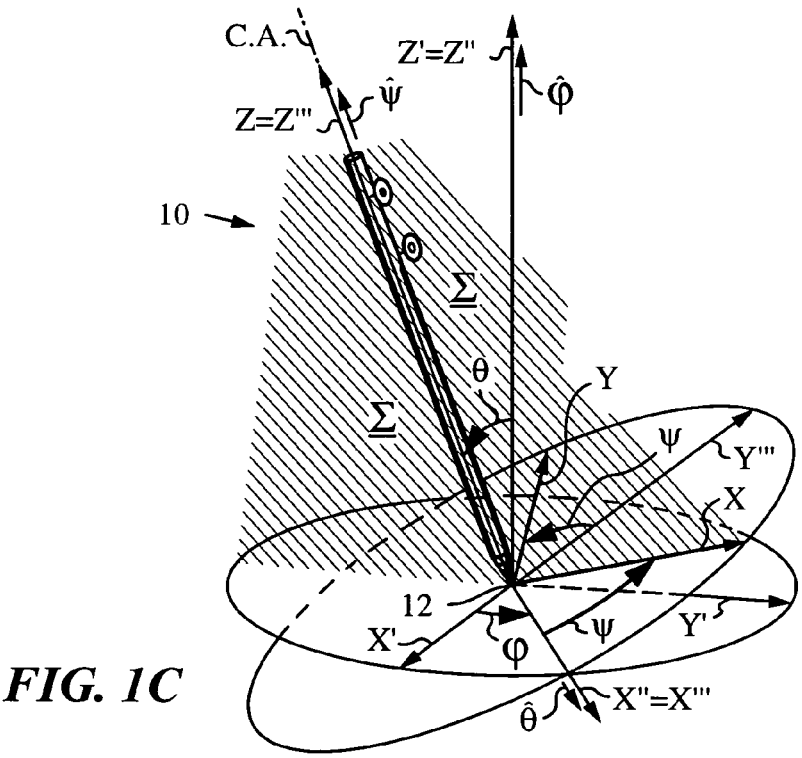

A third counterclockwise rotation by third Euler angle $\psi$ is applied to twice rotated object coordinates $(X''',Y''',Z''')$ as shown in FIG. 1C. Rotation by $\psi$ is performed about twice rotated axis $Z'''$ that is already collinear with object axis Z rotated by all three Euler angles. Meanwhile, twice rotated axes $X''',Y'''$ are rotated by $\psi$ to yield object axes X,Y rotated by all three Euler angles. Object axes X,Y,Z rotated by all three Euler angles $\phi$, $\theta$ and $\psi$ define Euler rotated object coordinates $(X,Y,Z)$. Note that tip 12 of object 10 remains at the origin of all object coordinates during the Euler rotations. Also note that a plane $\Sigma$ containing axis C.A. of object 10 and first point of view 18 of projector 14 is now at angle $(\pi/2)-\psi$ to plane $\Pi$ containing axis $Z'$ and axis Z.

Figure 2:
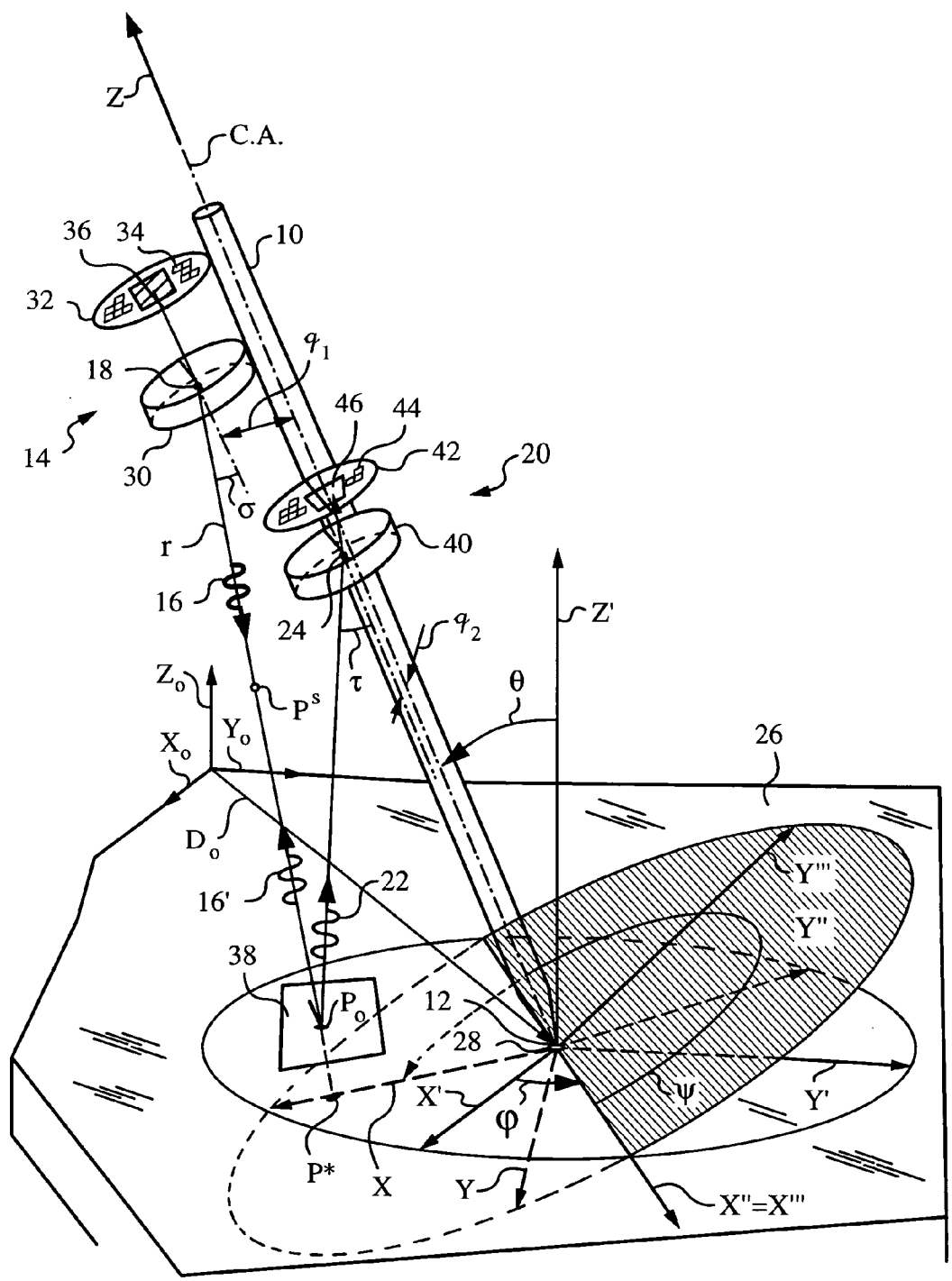
FIG. 2 is a three-dimensional view illustrating the elongate object of FIGS. 1A–C in more detail in its Euler rotated pose.

In FIG. 2 object 10 is shown in more detail with tip 12 contacting a plane surface 26 at a contact point 28 after all three Euler rotations. Note that in this drawing a different value of third Euler angle $\psi$ from that used in FIG. 1C is selected for better visualization. Surface 26 is defined by an $(X_o,Y_o)$ plane in world coordinates $(X_o,Y_o,Z_o)$. In the world coordinates object axis $Z'$ prior to the three Euler rotations is normal to plane $(X_o,Y_o)$ Now, second Euler angle $\theta$ defines the only counterclockwise rotation of object coordinates that is not about an object Z axis (this second rotation is about the $X''=X'''$ axis rather than axis $Z'$, $Z''$ or $Z'''$). Thus, Euler angle $\theta$ is an inclination angle $\theta$ between the completely Euler rotated object axis Z or axis C.A. and original object axis $Z'$, which is normal to plane $(X_o,Y_o)$ at contact point 28 of tip 12.

Projector 14 has a structured light optic 30 with first point of view 18. In the present case, optic 30 is a single lens, though it will be appreciated that more complex optics including several lenses and other optical elements can be used as optic 30. Projector 14 also has an emitter 32 for producing probe radiation 16. In this embodiment emitter 32 is an active array having active pixels 34, of which only a few are indicated for reasons of clarity. By activating appropriate pixels 34 active array 32 produces probe radiation 16 in a known geometric pattern 36 to produce a corresponding feature 38 when probe radiation 16 illuminates surface 26.

In FIG. 2 pattern 36 is shown as rectangular. In general, however, any symmetric or asymmetric pattern can be used including line sets such as grids, rectangles, ellipses, curves and polygons including the special cases of rectangular grids, squares, circles, points and regular polygons. Pattern 36 of probe radiation 16 produced by projector 14 is chosen to illuminate feature 38 suitable for deriving orientation parameters of object 10. Now, in order to produce a chosen pattern, optic 30 can be selected, without limitation, from elements such as holographic elements, diffractive elements, refractive elements, reflective elements and any combinations thereof.

Detector 20 has an optic 40 for admitting scattered portion 22 of probe radiation 16 returning to object 10 from surface 26 after scattering therefrom. In the present embodiment, optic 40 is a single lens, although a person skilled in the art will appreciate that various optical elements can be used as optic 40. Detector 20 also has a photodetector 42, in the present case a photodetector array of photosensitive pixels 44. Only a few pixels 44 are indicated for reasons of clarity. Optic 40 images and/or projects scattered portion 22 of probe radiation 16 onto photodetector array 42 to obtain a projection or an image 46 of feature 38.

The operation of this embodiment is based on the fact that when situated on plane surface 26 the orientation of object 10 affects the shape of feature 38. Meanwhile, the remaining parameters of the pose of object 10, i.e., the position of tip 12 on plane $(X_o-Y_o)$ does not affect the shape of feature 38 because surface 26 is plane. Now, of the three Euler angles $(\phi,\theta,\psi)$ that describe the orientation of object 10 only two have an effect on the shape of feature 38 produced by pattern 36 of probe radiation 16. These two are the second and third Euler angles, i.e., inclination angle $\theta$ and roll angle $\psi$.

The apparatus operates at times when tip 12 is contacting surface 26. This condition is ascertained by any suitable device or technique, e.g., with the aid of a sensor mounted near tip 12 (not shown). During operation, active array 32 emits probe radiation 16 for illuminating surface 26. Probe radiation 16 is emitted in rectangular pattern 36 and structured light optic 30 projects it at surface 26 from first point of view 18 at angle σ in plane Σ with respect to center axis C.A. of object 10. Probe radiation 16 propagates in rectangular pattern 36 and produces feature 38 on surface 26. Feature 38 is smaller, same size or larger than pattern 36, depending on the magnification of optic 30, and is distorted from the geometry of rectangular pattern 36 as a function of Euler angles θ, ψ. To understand this let us first review the result of the Euler rotations in general.

The origin of Euler rotated coordinates (X,Y,Z) at point 28 where tip 12 of object 10 contacts surface 26 is in world plane ($X_o,Y_o$). Note that this world plane is co-planar with plane (X',Y') of non-rotated object coordinates (X',Y',Z'). The origin of object coordinates (non-rotated and rotated) is offset from the origin of world coordinates ($X_o,Y_o,Z_o$) by a displacement vector $D_o$ where the length of $D_o$, i.e., $|D_o|$ is:

$$|D_o|=\sqrt{(x_0)^2+(y_0)^2}. \quad \text{(Eq. 1)}$$

It should be noted that the origin in world plane ($X_o,Y_o$) can be selected or defined as convenient for the application at hand. In general, however, if it is not necessary to define parameters beyond the orientation of elongate object 10, i.e., when pose information is not necessary, then knowledge of the origin of world coordinates ($X_o,Y_o,Z_o$) and displacement vector $D_o$ is not required.

Let vector r be drawn from point of view 18 at height $h_1$ and offset $q_1$ from axis C.A. to point $P_o$ where radiation 16 is incident on plane 26. Vector r is at angle σ to axis C.A. and in the plane Σ, i.e., in plane (X-Z) of Euler rotated object coordinates (X,Y,Z). Note that, if vector r were to pass through surface 26, it would intersect the X axis of Euler rotated object coordinates at a point P* also contained in the Σ plane.

Let point $P_o$ define the center of feature 38 that corresponds to the center of pattern 36. Given the object coordinates of any point on surface 26, we can obtain the position in world coordinates for the same point on surface 26 via several steps. In fact, the below derivation is valid for any point, not only for the particular point $P_o$. First, we need a coordinate transformation from plane (X',Y') in non-rotated object coordinates to plane (X,Y) in Euler rotated object coordinates. This transformation is defined in Euler angles by matrix R:

$$R = \begin{bmatrix} \cos\psi\cos\varphi - \cos\theta\sin\varphi\sin\psi & \cos\psi\sin\varphi + \cos\theta\cos\varphi\sin\psi & \sin\theta\sin\psi \\ -\sin\psi\cos\varphi - \cos\theta\sin\varphi\cos\psi & -\sin\psi\sin\varphi + \cos\theta\cos\varphi\cos\psi & \sin\theta\cos\psi \\ \sin\theta\sin\varphi & -\sin\theta\cos\varphi & \cos\theta \end{bmatrix}.$$

The coordinates of a point (x',y',z') in non-rotated object coordinates (X',Y',Z') are transformed to point (x,y,z) in Euler rotated object coordinates (X,Y,Z) by applying matrix R as follows:

$$(x,y,z)=R(x',y',z'). \quad \text{(Eq. 2A)}$$

A reverse coordinate transformation from Euler rotated to non-rotated object coordinates is performed as follows:

$$(x',y',z')=R^T(x,y,z), \quad \text{(Eq. 2B)}$$

where superscript T denotes the transpose of matrix R.

We observe that the collinear set of points $P^s$ along vector r including point P* and point $P_o$ can be described in the Euler rotated object coordinates by the following parametric equation:

$$P^s(x,y,z)=(q_1,0,h_1)+s[(x,y,0)-(q_1,0,h_1)]=(q_1+s(x-q_1), sy,h_1-sh_1), \quad \text{(Eq. 3)}$$

where s is a parameter. At point $P_o$ where probe radiation 16 propagating along vector r impinges on world plane ($X_o,Y_o$), namely at ($x_0^s,y_0^s,0$), the value of parameter s is:

$$s = \frac{(q_1\sin\theta\sin\psi + h_1\cos\theta)}{(h_1\cos\theta - (x - q_1)\sin\theta\sin\psi - y\sin\theta\cos\psi)}. \quad \text{(Eq. 4)}$$

Substituting this value of s into equation 3 yields point $P_o$ in Euler rotated object coordinates. Now, using transpose matrix $R^T$ from equation 2B one obtains scan point $P_o$ in world coordinates ($X_o,Y_o,Z_o$):

$$P_o(x_0^s,y_0^s,0)=R^T(P^s(x,y,z)). \quad \text{(Eq. 5)}$$

Note that the value of $z_0^s$ of point $P_o$ in world coordinates has to be zero because point $P_o$ must be on surface 26 in world plane ($X_o,Y_o$). The length of vector r represents the propagation distance of probe radiation 16 from first point of view 18 to point $P_o$ and is determined as follows:

$$r=|\vec{r}|=|(x-q_1,y,z-h_1)|. \quad \text{(Eq. 6)}$$

Figure 3:
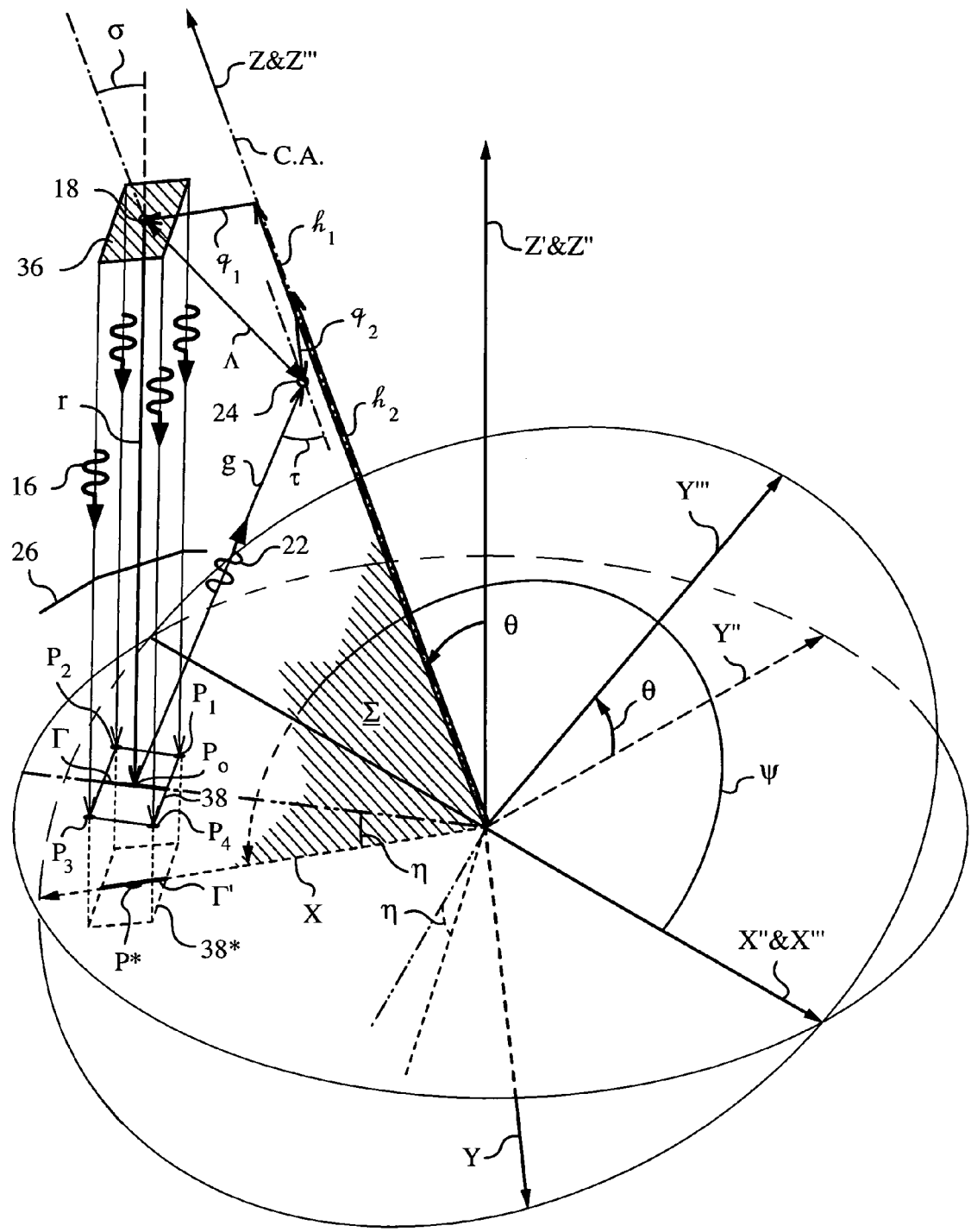
FIG. 3 is a three-dimensional diagram illustrating the last two Euler rotations of the elongate object of FIGS. 1A–C.

FIG. 3 affords a closer look at the result of the last two Euler rotations on feature 38. For better visualization, four rays of probe radiation 16 propagating to the corners of feature 38 are drawn. The corners are labeled as points $P_1$, $P_2$, $P_3$, $P_4$. Now, equations 3 through 5 can be used to derive the deformation of feature 38 as a function of the last two Euler angles, i.e., inclination and roll angles θ, ψ as long as the geometry of non-deformed feature 38* projected on plane (X-Y) is known. The geometry of non-deformed feature 38* can be empirically determined prior to all Euler rotations, or at least before the last two Euler rotations, or it can be determined a priori (e.g., from pattern 36 and other fixed optical and mechanical properties of the apparatus).

In general, optic 30 can have a magnification greater than or smaller than one. Irrespective of magnification, however, a back-scattered portion 16' of probe radiation 16 (see FIG. 2) will not provide any information about the deformation of feature 38. That is because back scattered portion 16' returns to the same point of view as the point of view from which it was projected, namely first point of view 18. For this reason, feature 38 has to be viewed by detector 20 from second point of view 24 afforded by optic 40. Thus, detector 20 detects scattered portion 22 of probe radiation 16 returning to object 10 after scattering from surface 26 along vector g. Scattered portion 22 arrives at second point of view 24 at a scatter angle τ with respect to center axis C.A.

A separation Λ between points of view 18 and 24 can be expressed as:

$$\Lambda=\sqrt{(h_1-h_2)^2+q_1^2+q_2^2}. \quad \text{(Eq. 7A)}$$

It should be noted that increasing separation Λ improves the performance of the apparatus as long as $h_2$ is not reduced to a very small or such that point of view 24 is kept well above tip 12. It should also be noted that equation 7A is limited to the special case where points of view 18, 24 are at right angles, as in the case of the embodiment in FIG. 2.

In general, points of view 18, 24 can be at any angle α relative to each other, such that equation 7A becomes:

$$\Lambda = \sqrt{(q_2\cos\alpha - q_1)^2 + (q_2\sin\alpha)^2 + (h_1 - h_2)^2} \qquad \text{(Eq. 7B)}$$

The deformation of feature 38 is determined from image 46, which captures the deformation of feature 38 from point of view 24. The shape of image 46 depends on vector g, which is computed using the mathematical formalism as described above for calculating vector r. This is done after the coordinates of $P_o$ are first determined for known angle σ, heights $h_1$, $h_2$ and offset $q_1$ for reference. Additional information on the computations is found in stereo vision references such a Trucco, Emanuele, Verri, Alessandro, *Introductory Techniques for 3-D Computer Vision*, New York: Prentice Hall 1998, ISBN 0-13-261108-2 and Faugeras, Olivier D., *Three-Dimensional Computer Vision: A Geometric Viewpoint*, Cambridge, Mass.: MIT Press 1993, ISBN 262-06158-9. It should also be noted that when optic 30 has a known image magnification and distortion, and when absolute size of image 46 is known then distance information, i.e., lengths of vectors r and g is contained in image 46 based on depth, as is understood in the art of three-dimensional vision, and further explained below.

Figure 4:
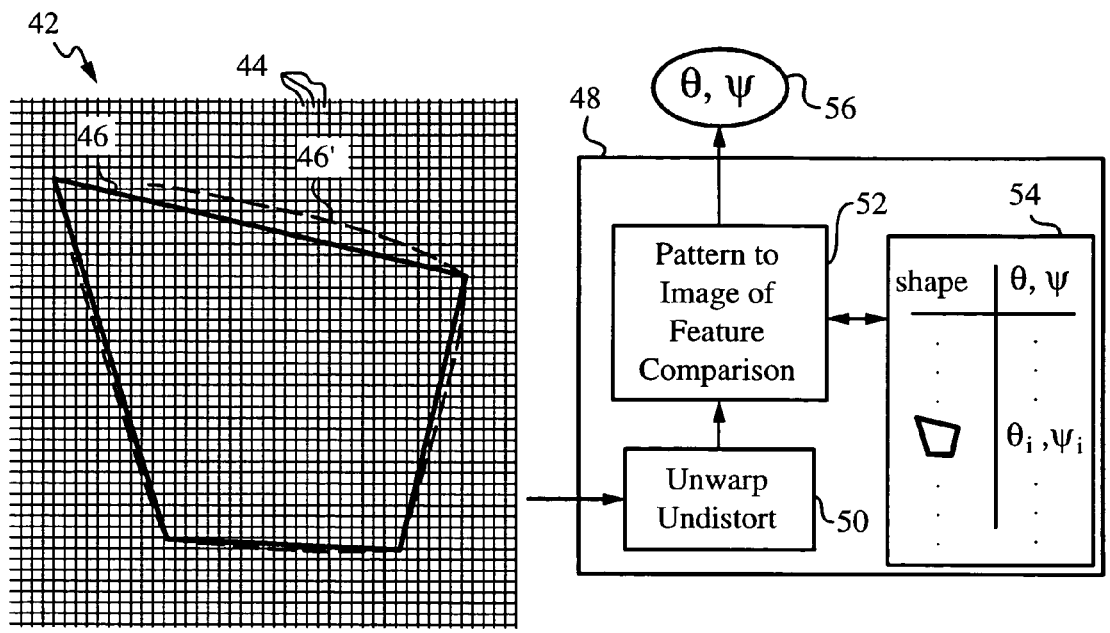
FIG. 4 is a block diagram showing the operations for recovering inclination and roll angles θ, ψ of the elongate object of FIGS. 1A–C.

To determine second and third Euler angles θ, ψ from image 46 detector array 42 reads out image 46 from pixels 44 to a unit 48 as shown in the block diagram of FIG. 4. Typically, image 46 projected on detector array 42 is warped and distorted to a distorted image 46' by optical aberrations and warping due to optic 40. Thus, after arriving in unit 48 an unwarping and undistorting module 50 pre-processes image 46 to remove the warping and distortion and recover image 46 in a perspective projection of feature 38. The unwarped and undistored image 46 is then processed by a comparison module 52 to determine at least one orientation parameter, in this case inclination and roll angles θ, ψ, from the difference between probe radiation 16 and scattered portion 22. More precisely, the difference between probe radiation 16 and scattered portion 22 is the difference between feature 38 produced by pattern 36 of probe radiation 16 and image 46 of projected feature 38 produced by scattered portion 22. The determination is made with the aid of a library of distorted features 38 at corresponding pairs of Euler angles $θ_i$, $ψ_i$ stored in a look-up table 54. Table 54 is preferably created prior to operating object 10 for the particular angle σ at which pattern 36 is projected on surface 26 from point of view 18. It should be noted that table 54 can also be created to incorporate the fixed distortions due to the optics, thereby eliminating the need for module 50.

Each pair of possible Euler angles $θ_i$, $ψ_i$ produces, for a given value of angle σ, a unique distortion of feature 38. When a match between image 46 and feature 38 is found in table 54, the corresponding values of $θ_i$ and $ψ_i$ are output as data 56. The comparison between feature 38 and its image 46 is particularly convenient when pattern 36 projected by active array 32 is asymmetric. That is because an asymmetric pattern 36 produces asymmetric feature 38 whose deformation is unique for each set of Euler angles θ, ψ. Suitable asymmetric patterns include, for example, non-orthogonal line sets, ellipses and irregular polygons.

Figure 5:
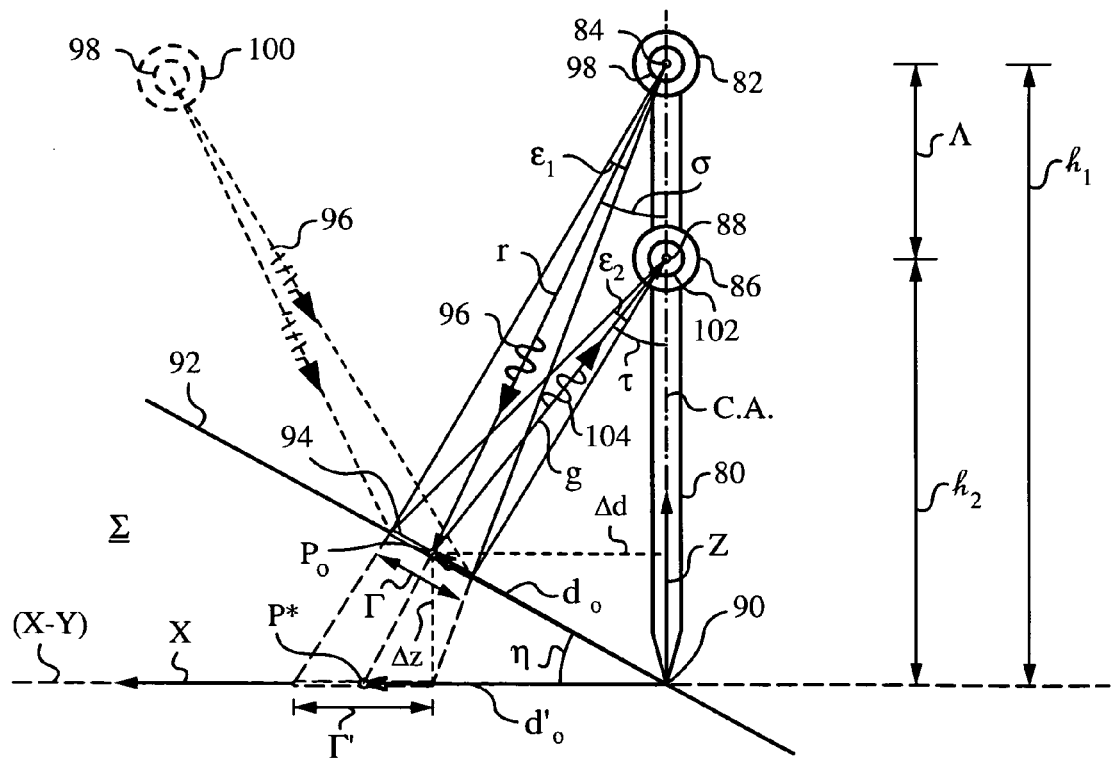
FIG. 5 is a cross-sectional side view of another elongate object in the Σ plane.

FIG. 5 is a cross-sectional side view in plane Σ of an elongate object 80 having a first optic 82 with a first point of view 84 at a height $h_1$ and a second optic 86 with a second point of view 88 at a height $h_2$. Points of view 84, 88 both fall on a center axis C.A. of object 80 such that offsets $q_1$ and $q_2$ are both zero in this embodiment. Object 80 is in its Euler rotated position with axis C.A. along the Z axis and second Euler angle θ defined between object axes Z" and Z. A tip 90 of object 80 is contacting a plane surface 92. The plane (X-Y) is indicated in dashed lines.

In plane Σ an inclination angle η between the original and final position of surface 92 is a function of Euler angles θ, ψ:

$$\sin η = \sin θ \cos ψ. \qquad \text{(Eq. 8)}$$

Consider now both first and second optics 82, 86 trained on a line segment Γ on surface 92. Line segment Γ corresponds to a slice of a feature 94 in plane Σ. Feature 94 is produced by a probe radiation 96 propagating in a pattern from a projector 98 which can illuminate surface 92 through either optic 82 or 86, or even through a third optic 100 on elongate object 80 or at a known remote location, as shown in dashed lines. For better visualization, corresponding inclination angle η and line segments Γ, Γ' of slices through feature 38 on surface 26 and non-deformed feature 38* in plane (X-Y) have been indicated in the three-dimensional view of FIG. 3.

Referring back to FIG. 5, the lengths of segment Γ as seen from points of view 84 and 88 of optics 82 and 86 are proportional to subtended angles $ε_1$, $ε_2$ within the small angle approximation range. Note that the Taylor expansion can be used at larger subtended angles. The lengths of segment Γ seen from points of view 84, 88 are also proportional to radial distances r and g from points of view 84 and 88. Thus the lengths of segment Γ seen from points of view 84, 88 and denoted by $Γ_1$ and $Γ_2$ are:

$$Γ_1 = rε_1, \qquad \text{(Eq. 9A)}$$

$$Γ_2 = gε_2, \qquad \text{(Eq. 9B)}$$

where angles $ε_1$, $ε_2$ are expressed in radians.

In the present embodiment feature 94 is produced by probe radiation 96 from projector 98 illuminating surface 92 through optic 82 at an angle σ to axis C.A. Feature 94 is detected by a detector 102 collecting a scattered portion 104 of probe radiation 96 through optic 86. Scattered portion 104 returns to object 80 at a scatter angle τ with respect to axis C.A. Since points of view 84 and 88 are separated by Λ, angles $ε_1$, $ε_2$ subtended by segment Γ differ, in general, for optics 82 and 86.

Equations 9A&B describe lengths of segments $Γ_1$, $Γ_2$ irrespective of where the pattern of probe radiation 96 producing feature 94 is projected from and where it is detected or viewed. In the present embodiment, the actual segment Γ is deformed from its original length Γ' as would be projected on surface 92 prior to second and third Euler rotations. Note that subtended angle $ε_1$ remains unchanged. The length of segment Γ projected on surface 92 after the last two Euler rotations is:

$$Γ = \frac{h_1}{\cos η}\left(\frac{\tan σ^+}{1 + \tan σ^+ \tan η} - \frac{\tan σ^-}{1 + \tan σ^- \tan η}\right). \qquad \text{(Eq. 10)}$$

where $$σ^+ = σ + \frac{ε_1}{2}, \quad σ^- = σ - \frac{ε_1}{2},$$

and where σ is at the center of subtended angle $ε_1$. The length of segment Γ' before the last two Euler rotations can be expressed in terms of segment Γ with the aid of trigonometry and using the relationship:

$$\frac{\Gamma}{\Gamma'} = \frac{d_o}{d'_o}$$

(within small angle approximation of $\epsilon_1$, $\epsilon_2$) to yield:

$$\Gamma' = \Gamma\frac{d'_o}{d_o} = \Gamma\left(\frac{\Delta d + \Delta z \tan\sigma}{d_o}\right) = \Gamma(\cos\eta + \sin\eta\tan\sigma). \quad \text{(Eq. 11)}$$

Segment Γ is observed from point of view 88 by optic 86 to subtend angle $\epsilon_2$. This value of angle $\epsilon_2$ as well as scatter angle τ depend on the value of angle η, i.e., they depend on the last two Euler rotations. Before these rotations scatter angle τ at the center of subtended angle $\epsilon_2$ can be expressed in terms of angle σ as:

$$\tau = \tan^{-1}\left(\frac{h_1 \tan\sigma}{h_2}\right), \quad \text{(Eq. 12)}$$

and subtended angle $\epsilon_2$ can be expressed as:

$$\varepsilon_2 = \tan^{-1}\left(\frac{h_1 \tan\sigma^+}{h_2}\right) - \tan^{-1}\left(\frac{h_1 \tan\sigma^-}{h_2}\right) \quad \text{(Eq. 13)}$$

Now, after the last two Euler rotations scatter angle τ and subtended angle $\epsilon_2$ change as follows:

$$\tau = \tan^{-1}\left(\frac{h_1 \tan\sigma}{h_2 + (h_2 - h_1)\tan\eta\tan\sigma}\right), \quad \text{(Eq. 14)}$$

$$\varepsilon_2 = \tan^{-1}\left(\frac{h_1 \tan\sigma^+}{h_2 + (h_2 - h_1)\tan\eta\tan\sigma^+}\right) - \tan^{-1}\left(\frac{h_1 \tan\sigma^-}{h_2 + (h_2 - h_1)\tan\eta\tan\sigma^-}\right), \quad \text{(Eq. 15)}$$

Equation 15 is now used in equation 9B to obtain the length of segment $\Gamma_2$ as seen through optic 86 of detector 102, namely:

$$\Gamma_2 = g\left[\tan^{-1}\left(\frac{h_1 \tan\sigma^+}{h_2 + (h_2 - h_1)\tan\eta\tan\sigma^+}\right) - \tan^{-1}\left(\frac{h_1 \tan\sigma^-}{h_2 + (h_2 - h_1)\tan\eta\tan\sigma^-}\right)\right] \quad \text{(Eq. 16)}$$

The length of vector g can now be calculated analogously to r (see equation 6) at a known angle η, i.e., for a known pair of second and third Euler angles for calibration. Then angle η is determined from the length difference between segment $\Gamma_2$ at the known angle η, e.g., at η=0 and at the new angle η≠0 resulting from the last two Euler rotations.

Knowing angle η still does not yield the values of last two Euler angles θ, ψ, as is clear from revisiting FIG. 3. That is because different pairs of Euler angles θ, ψ can produce the same angle η. For example, as indicated in dashed lines, a larger third Euler angle ψ with the same angle θ will result in the same value of angle η. Thus, additional information, such as the two-dimensional geometry of feature 94 on plane 92 is necessary to determine which pair of Euler angles θ, ψ is responsible for the determined value of angle η. In particular, referring back to FIG. 5, a line segment corresponding to a slice through feature 94 along a direction perpendicular to plane Σ can be observed from point of view 88 or even from a different point of view to determined the correct pair of Euler angles θ, ψ. For this reason, it is preferable that the pattern of probe radiation 96 be asymmetric so that the deformation of feature 94 can show which pair of Euler angles θ, ψ is producing the determined angle η simply from the change in two-dimensional shape of feature 94 projected on surface 92.

Alternatively, another point of view can be provided for observing segment Γ and deriving the additional information from a third length $\Gamma_3$ as seen from that other point of view. In still other alternatives, more features can be produced at different angular positions around center axis C.A. and these features can be observed from point of view 88 and/or from still other point or points of view. A person skilled in the art of stereo vision will appreciate that a great variety of alternative solutions can be used to obtain Euler angles θ, ψ from feature 94 based on the fact that knowledge of three non-collinear and co-planar points is sufficient to define a surface, e.g., surface 92. These alternative approaches are found in standard literature on stereo vision, including Faugeras, Olivier D., *Three-Dimensional Computer Vision: A Geometric Viewpoint* (op-cit.).

Figure 6:
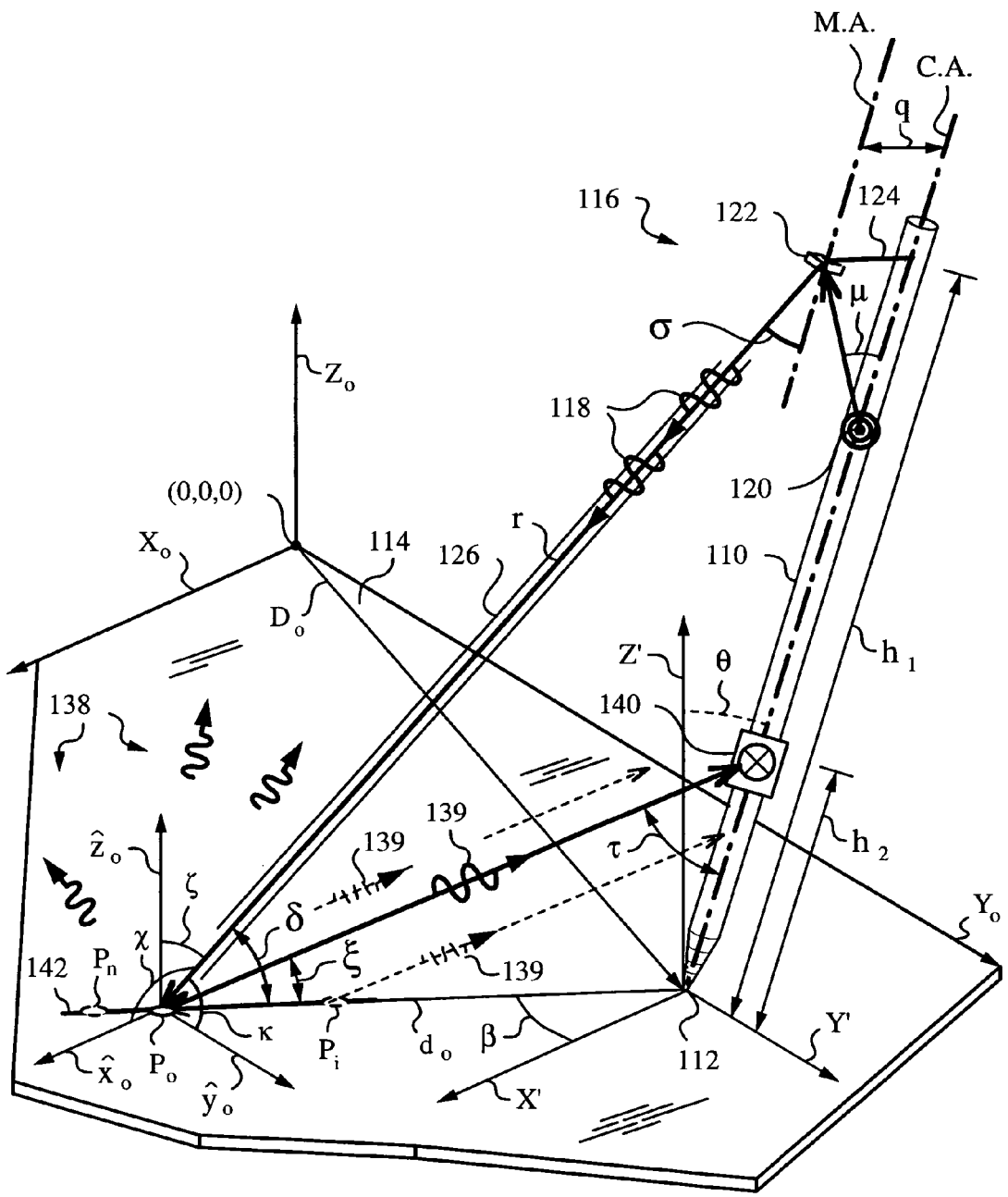
FIG. 6 is an isometric view of an elongate object employing a scanning arrangement for projecting a pattern of probe radiation.

FIG. 6 is an isometric view of another elongate object 110 with a tip 112 contacting a plane surface 114. Object 110 is shown in Euler rotated coordinates (X,Y,Z) and world plane $(X_o, Y_o)$ corresponds to plane surface 114. For example, if object 110 is a pointer then surface 114 can be a screen or a pad, if object 110 is a jotting implement, e.g., a pen or pencil then surface 114 can be a sheet of paper, and if object 110 is a stylus then surface 114 can be a screen of a digital input device. The origin $X_o, Y_o, Z_o$ of world coordinates $(X_o, Y_o, Z_o)$ is taken in the upper right corner of surface 114 in this embodiment.

Object 110 uses a scanning arrangement 116 as the projector for illuminating plane surface 114 with probe radiation 118. Scanning arrangement 116 has an emitter 120 of probe radiation 118 and a scan mirror 122 mounted on an arm 124. Emitter 120 is preferably a coherent source, e.g., a laser diode or a Vertical Cavity Surface Emitting Laser (VCSEL), however, non-coherent sources including light emitting diodes (LEDs) can also be used. In the present embodiment emitter 120 is a single frequency emitter, specifically a VCSEL emitting probe radiation 118 at a single frequency f and at an emission angle μ to center axis C.A. of object 110. Optics 130 (see FIG. 7) are provided in the path of probe radiation 118 to form a collimated scan beam 126.

Scan mirror 122 is mounted on scan arm 124 at a height $h_1$ and extending perpendicular to axis C.A. The length of scan arm 124 is q. Scan mirror 122 reflects scan beam 126 at an angle σ with respect to axis C.A. In fact, scan mirror 122 is used to control and vary angle σ at which scan beam 126 is projected on surface 114. As presently shown, scan mirror 122 is in an undeflected or neutral position and its mirror axis M.A. is parallel to axis C.A. Hence, angle σ at which probe radiation 118 is projected on surface 114 from scan mirror 122 in neutral position is equal to emission angle μ.

Scan beam 126 is directed along a path indicated by vector r and impinges on surface 114 to form a scan point $P_o$ at $(x_0^s, y_0^s, 0)$ in world plane $(X_o, Y_o)$ of world coordinates $(X_o, Y_o, Z_o)$. The origin of Euler rotated coordinates $(X, Y, Z)$ at tip 112 of object 110 is on surface 114, i.e., also in world plane $(X_o, Y_o)$. Note that this world plane is co-planar with plane $(X', Y')$ of non-rotated object coordinates $(X', Y', Z')$. The origin of object coordinates (non-rotated and rotated) is offset from the origin of world coordinates $(X_o, Y_o, Z_o)$ by displacement vector $D_o$. Also, scan point $P_o$ in world coordinates $(X_o, Y_o, Z_o)$ is offset from the origin of object coordinates by vector $d_o$ that is at an angle $\beta$ to axis X' in non-rotated plane $(X', Y')$ or in world plane $(X_o, Y_o)$.

Figure 7:
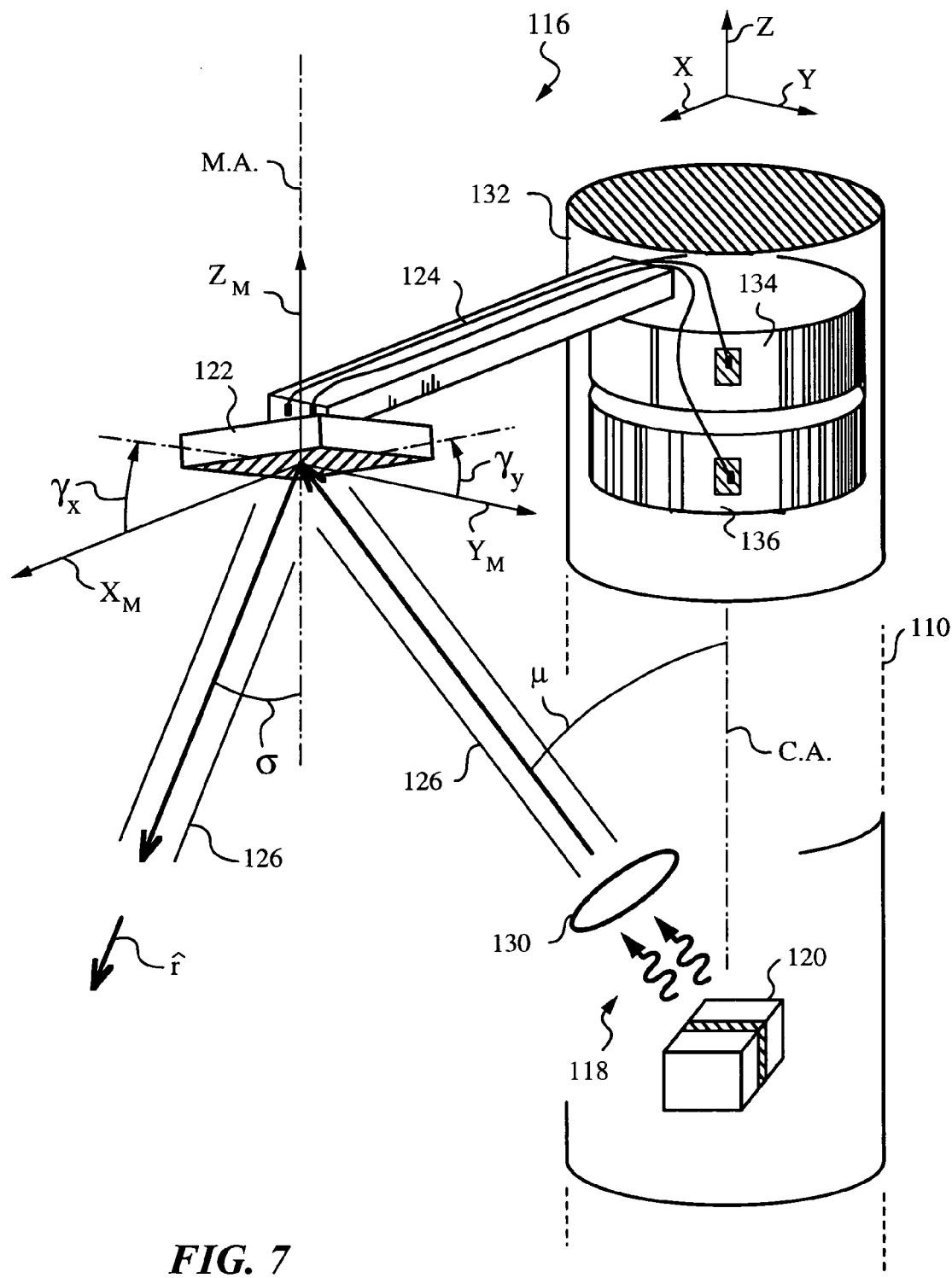
FIG. 7 is a three-dimensional view illustrating an exemplary biaxial scanner.

Scan arm 124, scan mirror 122, emitter 120 and optics 130 are all part of scanning arrangement 116, as better illustrated in FIG. 7. Scanning arrangement 116 scans probe radiation 118 collimated in scan beam 126 by optics 130 over surface 114 by varying angle σ. To accomplish this, scanning arrangement 116 has a biaxial scanner 132 consisting of an X-driver 134 and a Y-driver 136 for varying angle σ along two axes denoted here by $X_M$ and $Y_M$. Scan mirror 122 is a biaxial scan mirror and is preferably a MEMs mirror. Alternatively, two uniaxial mirrors can be used instead of single biaxial scan mirror 122. Both, uniaxial and biaxial mirrors are known in the art. Although scanning axes $X_M$ and $Y_M$ are orthogonal in this embodiment, a skilled artisan will appreciate that this is not required.

X-driver 134 varies angle (a by controlling an x-deflection $\gamma_x$ of mirror 122 to axis $X_M$. Y-driver 136 varies angle σ by controlling a y-deflection $\gamma_y$ of mirror 122 to axis $Y_M$. For small deflections, the variation in angle σ can be expressed in terms of x- and y-components of angle σ, i.e., $\sigma_x$ and $\sigma_y$, and can thus be expressed as:

$$\sigma = (\sigma_x, \sigma_y) = (\mu + 2\gamma_x, 2\gamma_y). \tag{Eq. 17}$$

It should be noted that x- and y-components of angle σ are defined with respect to the mirror axis M.A. indexed in neutral or undeflected position or equivalently with respect to axis C.A. of object 110 in Euler rotated object coordinates.

Referring back to FIG. 6, note that scan beam 126 or vector r impinges on surface 114 at scan point $P_o$. To obtain the position of scan point $P_o$ in world coordinates on surface 114 several steps are required. First, we need a coordinate transformation from non-rotated object coordinates, which are defined in the same manner as in FIGS. 1A–C, to plane $(X, Y)$ in Euler rotated object coordinates. This transformation is defined in Euler angles by matrix R, as described above. Also, as described above, the coordinates of a point $(x', y', z')$ in non-rotated object coordinates $(X', Y', Z')$ are transformed to point $(x, y, z)$ in Euler rotated object coordinates $(X, Y, Z)$ by applying matrix R and the reverse transformation is performed with the aid of the transpose of matrix R.

Now, the position of scan point $P_o$ on surface 114 in world coordinates is controlled by biaxial scanner 116. Employing the mathematical formalism explained above, the transpose matrix $R^T$ from equation is used to obtain scan point $P_o$ in world coordinates $(X_o, Y_o, Z_o)$, i.e., $P_o(x_0^s, y_0^s, 0)$:

$$P_o(x_0^s, y_0^s, 0) = R^T(P^s(x, y, z)) + D_o. \tag{Eq. 18}$$

Again, if it is not necessary to know the absolute position of tip 112 in world coordinates but only the orientation of object 110 then knowledge of vector $D_o$ is not required and its addition is unnecessary. Note that the value of $z_0^s$ of point $P_o$ in world coordinates has to be zero because scan point $P_o$ is in world plane $(X_o, Y_o)$.

The length of vector r represents the propagation distance of scan beam 126 from mirror 122 to scan point $P_o$ and is determined as before:

$$r = |\vec{r}| = |(x-q, y, z-h_1)|. \tag{Eq. 19}$$

Knowledge of the length of vector r is used to determine an angle of incidence δ of scan beam 126 to surface 114, as shown in FIG. 6. Angle δ is the angle between vector $d_o$ from the origin of the object coordinates to scan point $P_o$ and vector r from mirror 122 to scan point $P_o$. Therefore, angle δ can be expressed as:

$$\delta = \cos^{-1}\left\{\frac{(x, y, z) \cdot \vec{r}}{|(x, y, z)||\vec{r}|}\right\} \tag{Eq. 20}$$

$$= \cos^{-1}\left\{\frac{[x^2 + y^2 + z^2 - (xq + zh_1)]}{\sqrt{x^2+y^2+z^2}\sqrt{(x-q)^2+y^2+(z-h_1)^2}}\right\},$$

where $(x, y, z)$ are the coordinates of scan point $P_o$ in Euler rotated object coordinates. The angle β of vector $d_o$ to non-rotated object axis X' is obtained from the dot product rule with axis X' or world axis $X_o$.

Probe radiation 118 illuminating plane surface 114 scatters based on incident directions of probe radiation 118 to surface 114, frequency f of probe radiation 118 as well as physical characteristics of surface 114. A bidirectional reflectance distribution function (BRDF) describes the spectral and spatial characteristics of a scattered portion 138 of probe radiation 118. The BRDF is a ratio of reflected radiance to incident flux density for all incident and reflected directions. The incident directions are fully described by direction cosines χ, κ and ζ, which can be obtained from the dot product of vector r with world unit vectors $\hat{x}_0, \hat{y}_0, \hat{z}_0$. Similarly, direction cosines (not shown) to unit vectors $\hat{x}_0, \hat{y}_0, \hat{z}_0$ describe the reflected directions of scattered portion 138.

Often surface 114 is Lambertian or almost Lambertian and the BRDF shows a continuous decrease from a maximum at ζ=0 (normal incidence). Whether surface 114 is or is not Lambertian, its BRDF should be measured at anticipated incident and reflected directions for calibration purposes. In the simplest cases third Euler angle ψ is close or equal to π/2 or 3π/2. In these cases BRDF is described directly in terms of angle of incidence δ with respect to surface 114 or angle δ'=(π/2)−δ with respect to surface normal $\hat{z}_0$ without having to compute direction cosines. For other values of Euler angle ψ the direction cosines have to be used for a full description of the incident directions.

The response of scattered portion 138 of probe radiation 116 to surface 114 can thus be described by a change in the intensity of scattered portion 138 as a function of reflected directions. In general, the response of scattered portion 138 to surface 114 can include not only a change in intensity but also a polarization-based response.

Object 110 has a detector 140 for detecting scattered portion 138 of probe radiation 118 returning from plane surface 114 at scatter angle τ to axis C.A. For better visualization, scattered portion 138 returning at angle τ is designated by reference 139. Detector 140 is mounted at a height $h_2$ such that it is offset from scanning arrangement 116. Projector or scanning arrangement 116 has a first point of view determined by the position of scan mirror 122, namely at height $h_1$ and an offset q from axis C.A. Meanwhile, detector 140 has a second point of view at height $h_2$ and at zero offset from axis C.A.

Detector 140 is used to determine at least one orientation parameter of elongate object 110 from scattered portion 139 arriving at scatter angle τ. In this embodiment scanning arrangement 116 uses a radial pattern to vary angle σ in the plane defined by axis C.A. and arm 124 with length q. Thus, a feature 142 produced on surface 114 by the pattern of temporally varying and spatially varying probe radiation 118, i.e., the scan pattern of scan beam 126, is a scan line or, more precisely, a radial scan line. It should be noted that although scanning arrangement 116 is biaxial, a uniaxial scanning arrangement with a uniaxial scan mirror can be used to produce radial scan line 142.

Figure 8:
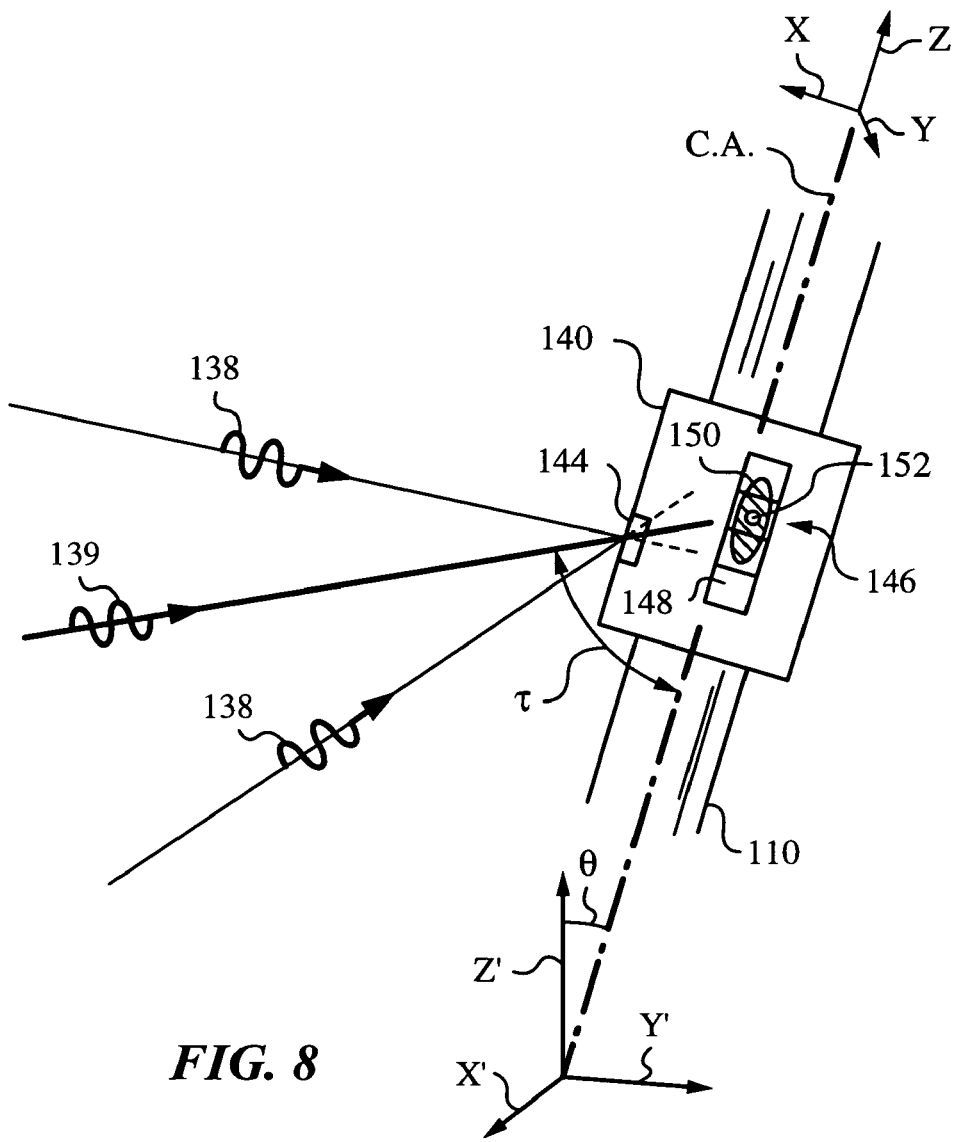
FIG. 8 is a detailed view of the detector used by the elongate object of FIG. 6.

To ensure that only scattered portion 139 returning at scatter angle τ is considered, detector 140 has a narrow field angle reception unit 144 as illustrated in FIG. 8. Unit 144 can be a cylindrical lens, a collimating lens, a thick aperture or system of apertures, a slit or any other suitable device for filtering out scattered portion 138 that is not arriving at scatter angle τ.

Detector 140 has a photodetector 146 for measuring scattered portion 139. Preferably, photodetector 146 is a photodetector array with a number of pixels 148. Thus, when scattered portion 139 impinges on array 146 it creates a spot 150 extending over a number of pixels 148. Knowledge of a centroid 152 of spot 150 of scattered portion 139 can be used to confirm that scattered portion 139 is arriving at scatter angle τ with more accuracy.

Since detector 140 is mounted at height $h_2$ and unit 144 accepts scattered portion 139 arriving at scatter angle τ only, there is one point along scan line 142 from which scattered portion 139 can strike photodetector 146. In the present figure this is scan point $P_o$. At all other points along scan line 142 scattered portion 139 arriving at scatter angle τ will be rejected, since it will arrive either above or below detector 140 and far away from unit 144. This is indicated in dashed lines in FIG. 6 for scattered portions 139 arriving from scan points $P_i$ and $P_n$ along scan line 142.

Figure 9:
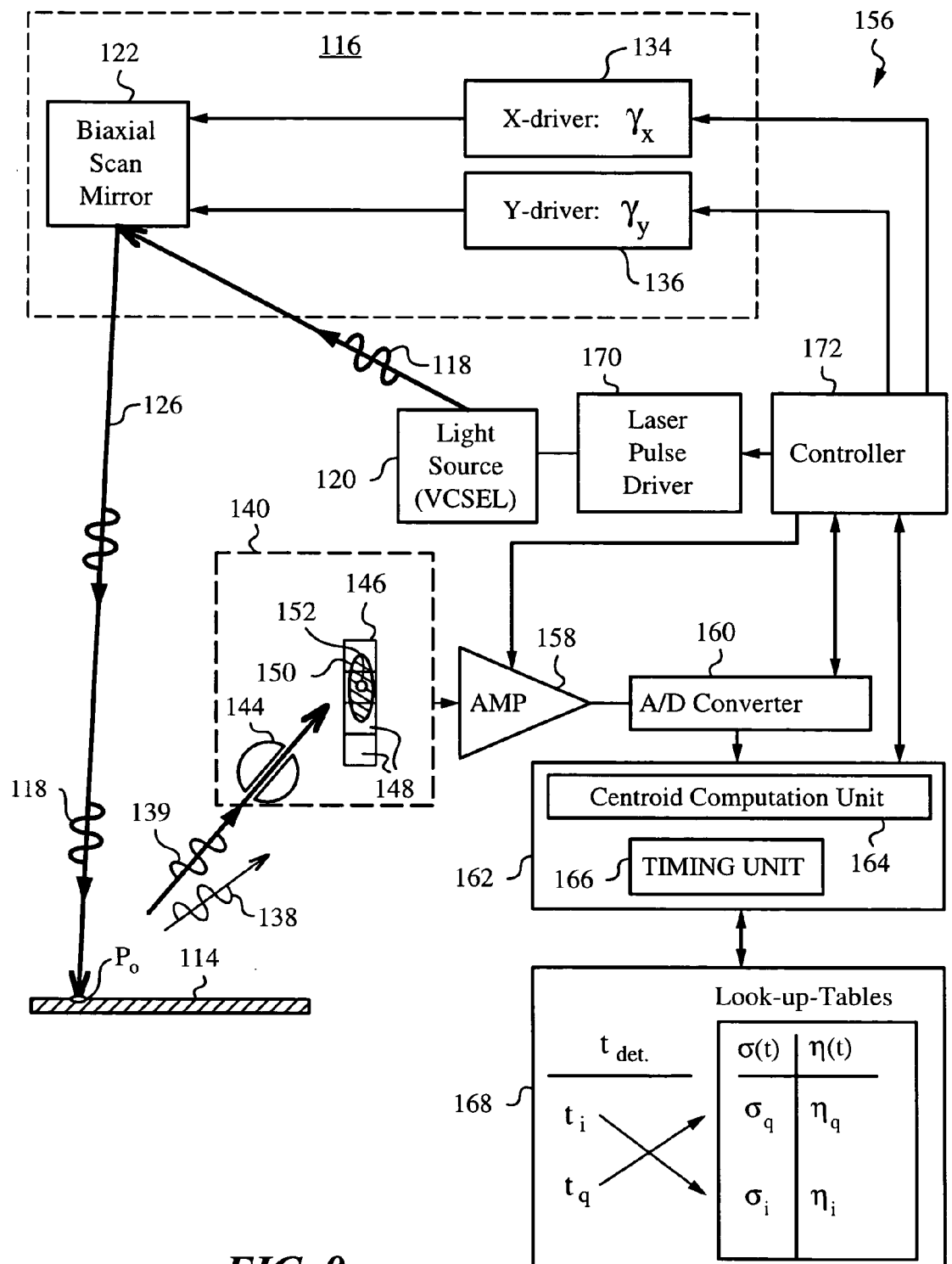
FIG. 9 is a block diagram illustrating the derivation of inclination angle θ for the elongate object of FIG. 6.

FIG. 9 shows a block diagram of an exemplary control circuit 156 for operating scanning arrangement 116 and deriving at least one orientation parameter of object 110. A person skilled in the art will appreciate that various control circuits can be used and that their design depends, among others, on the type of detector 140, light source 120 and scanning arrangement 116. It should also be noted that light source 120 can be operated in a pulsed or continuous mode.

Circuit 156 is connected to scanning arrangement 116 and to detector 140. Circuit 156 has an amplifier 158 connected to detector 140 and an analog-to-digital converter ADC 160 connected to amplifier 158. Amplifier 158 amplifies signals from detector 140 and it can be a transimpedance amplifier, an operational amplifier or any other suitable amplifier. ADC 160 is matched for digitizing the amplified signal from amplifier 158. Circuit 156 also has a processing unit 162 connected to ADC 160 for receiving digital signals corresponding to signals generated by detector 140.

Processing unit 162 has a centroid computation unit 164 for computing centroid 152 of spot 150. Further, unit 156 has a timing unit 166 for deriving at least one orientation parameter of object 110 from a detection time of scattered portion 139 by detector 140. Timing unit 166 communicates with a module 168. Module 168 contains look-up tables that chart the time value of angle σ(t) for scan line 142.

In the present case, angle σ(t), or scan angle, is varied only by x-deflection $\gamma_x$ to produce scan line 142. In other words, biaxial scanner 116 uses only X-driver 134 to vary x-deflection $\gamma_x$ while y-deflection $\gamma_y$ is held at zero. (As remarked above, a uniaxial scanner can also be used in this case.) More precisely, X-driver 143 varies x-deflection $\gamma_x$ in a periodic fashion as follows:

$$(\gamma_x, \gamma_y) = (A \sin \omega_x t, 0),\qquad\text{(Eq. 21)}$$

where $\omega_x$ is the angular frequency and A is the deflection amplitude. Thus, the instantaneous value of scan angle σ(t) obtained by substituting from equation 17 is:

$$\sigma(t) = \mu + 2A \sin \omega_x t.\qquad\text{(Eq. 22)}$$

It is important to note that at different inclination η the location of point $P_o$ along scan line 142 from which scattered portion 139 is admitted by unit 144 into detector 140 differs. As a result, a detection time $t_{det.}$ during each cycle of scan angle σ(t) when scattered portion 139 is detected by detector 140 differs as a function of inclination η. Therefore, angle η produced by the last two Euler rotations and contained in the same plane as scan arm 124, center axis C.A. and scan line 142 can be tabulated as a function of detection time $t_{det.}$. Module 168 preferably indexes detection time $t_{det.}$ of scattered portion 139 to the instantaneous value of scan angle $\sigma(t) = \sigma(t_{det.})$ and the corresponding angle η. To ensure rapid response, module 168 is a rapid access memory. Alternatively, module 168 can compute the value of angle η based on detection time $t_{det.}$ and instantaneous value of scan angle $\sigma(t_{det.})$ rather than use look-up tables.

A laser pulse driver 170 of circuit 156 is connected to VCSEL 120 for controlling the generation of probe radiation 118. A controller 172 orchestrates the operation of circuit 156 and synchronizes it with scanning arrangement 116 and detector 140. For this purpose, controller 172 is connected to X- and Y-drivers 134, 136, laser pulse driver 170, amplifier 158, ADC 160 and processing unit 162.

During operation, elongate object 110 executes motions while tip 112 is on surface 114. In the preferred embodiment, the value of angle η is determined over time periods that are very short in comparison to the times during which object 110 moves by any appreciable amount. Controller 172 ensures that the operation is sufficiently rapid by adjusting the rate of operation of VCSEL 120 and scanning arrangement 116. Specifically, controller 172 instructs laser pulse driver 170 to drive VCSEL 120 at a certain pulse rate or even continuously. Angle σ(t) varies because X-driver 134 is instructed by controller 172 to change x-deflections $\gamma_x$ to produce radial scan line 142. Scan beam 126 of probe radiation 118 passes over surface 114 and produces scattered portion 138 of probe radiation 118. As remarked above, only scattered portion 139 returning from scan point $P_o$ on surface 114 (see FIG. 6) is at the requisite height and scatter angle τ to be admitted by unit 144 into detector 140.

Now, controller 172 operates X-driver 134 of scanning arrangement 116 such that angle σ(t) varies sufficiently rapidly, i.e., such that successive radial line scans 142 are generated at a high repeat rate. For example, when object 110 is a human-operated implement such as a cane, a pointer or a jotting implement such as a pen, pencil or stylus, then angle σ(t) preferably varies fast enough to execute one complete scan line 142 before any appreciable human movement takes place.

It should be noted that scan line 142 is composed of successive locations of scan point $P_o$ and that line 142 can be discontinuous or continuous depending on the pulsing of VCSEL 120. Note that patterns other than scan line 142 can be produced by controller 172 instructing X-driver 134 and Y-driver 136 to vary x- and y-deflections $\gamma_x, \gamma_y$, and thus vary angle σ(t) in any convenient pattern.

During operation detector 140 generates a signal corresponding to the intensity of scattered portion 139 of probe radiation 118 returning at scatter angle τ. Amplifier 158 amplifies this signal to a gain level sufficient for conversion to a digital signal by ADC 160. Controller 172 supervises this process and adjusts gain of amplifier 158 as necessary.

The amplified signal is delivered to processing unit 162. During the continuous scan of angle σ(t) processing unit 162 registers detection time $t_{det.}$ when scattered portion 139 is observed. Specifically, centroid computation unit 164 monitors the exact value of scatter angle τ from the location of centroid 152 of spot 150. When centroid 152 of spot 150 corresponds precisely to scatter angle τ, which occurs when centroid 152 falls on the central pixel 148, then that time is taken as detection time $t_{det.}$ by timing unit 166.

For any detection time $t_{det.}$ recorded by timing unit 166 one has to know the precise value of instantaneous scan angle $\sigma(t_{det.})$. This value can be obtained from X-driver 134, or, preferably, from a mirror monitoring mechanism (not shown) that verifies the instantaneous deflection of scan mirror 122. In the present case, for two detection times $t_i$ and $t_q$ recorded by timing unit 166 and sent to module 168 the corresponding instantaneous deflections $\sigma_i$ and $\sigma_q$ are obtained from the mirror monitoring mechanism.

Figure 10:
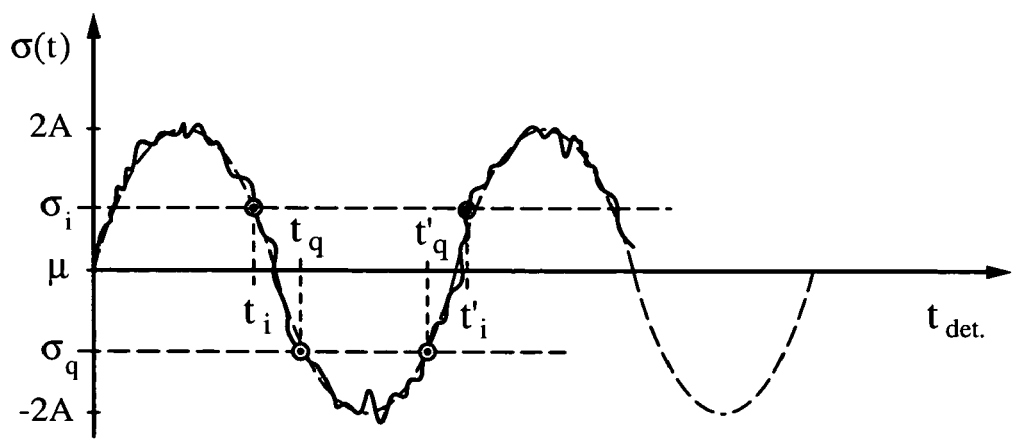
FIG. 10 is a graph of scan angle as a function of detection time.

FIG. 10 illustrates a graph of scan angle σ(t) as a function of detection time $t_{det.}$. The dashed line indicates the ideal value of scan angle σ(t) as driven by X-driver 134. The solid line indicates the actual value of scan angle σ(t) as registered by the mirror monitoring mechanism. Referring back to FIG. 9, a look-up table in module 168 is used to find the values of inclination angle η, namely $\eta_i$ and $\eta_q$ corresponding to scan angles $\sigma_i$ and $\sigma_q$ at which signals were detected. Thus, inclination angles $\eta_i$, $\eta_q$ are obtained from detection times of scattered portion 139 recorded by timing unit 166. It should be noted that module 168 can have a processor for performing calculations of angles $\eta_i$ and $\eta_q$ based on detection times, heights $h_1$, $h_2$ and scatter angle τ rather than relying on the look-up table.

Although angle η represents a useful orientation parameter of object 110 it is often desirable to obtain one or both Euler angles θ, ψ. These are derived with additional measurements. For example, an additional scanning arrangement with an arm perpendicular to axis C.A. and perpendicular to arm 124 can be mounted on object 110. This additional arm can be provided with a scan mirror and be used to measure inclination angle η in a plane perpendicular to plane Σ. Either the same detector 140 or another detector dedicated to the new scanning arrangement can be used to obtain a scattered portion produced by this second scanning arrangement and measure the detection time. Once the value of angle η in this other plane is known, then the values of Euler angles θ, ψ can be derived.

In a preferred embodiment timing unit 166 is mounted on object 110 such that the determination of detection time $t_{det.}$ is performed on-board. In fact, entire circuit 156 can be mounted on object 110. Alternatively, module 168 is remote and maintains communication with the remainder of circuit 156 via a communication link (not shown). It is also preferred that controller 172 decrease the amplitude and DC offset of x-deflection $\gamma_x$ in response to feedback from timing unit 166, thereby decreasing the range of scan angle σ(t) to oscillate around the value $\sigma_o(t)$ which corresponds to the instantaneous value of inclination angle η. Such feedback arrangement allows for real-time tracking of angle η.

Figure 11:
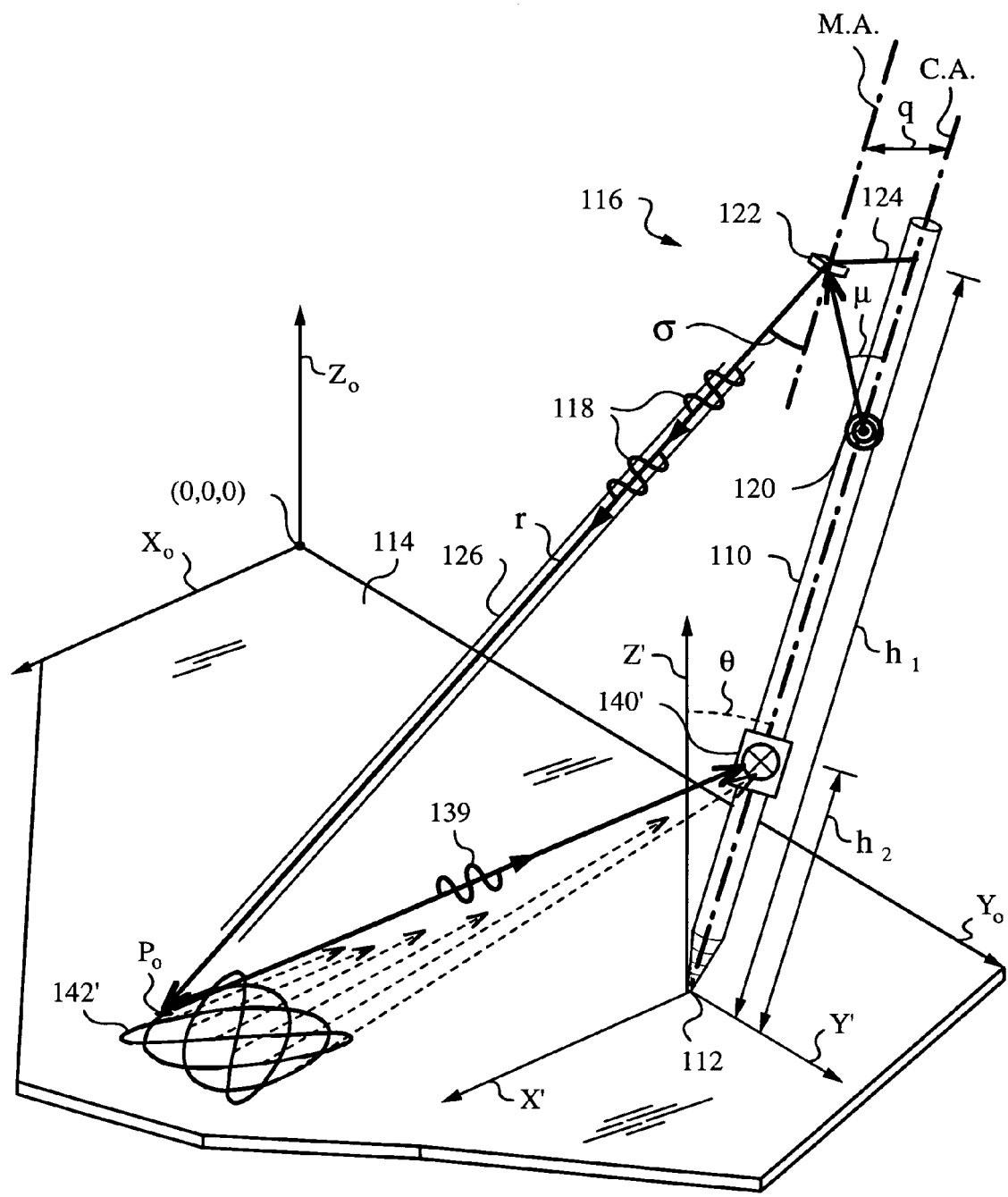
FIG. 11 is an isometric view of the elongate object of FIG. 6 in a different operation mode.

FIG. 11 illustrates another operation mode of scanning arrangement 116 of object 110. In this case X-driver 134 and Y-driver 136 are used to produce a biaxial scan pattern 142'. Thus, scan angle σ(t) changes because of an x-deflection $\gamma_x$ and a y-deflection $\gamma_y$. Scan pattern 142' can be a raster scan pattern, a line scan pattern, a Lissajous figure or some other scan pattern. In a preferred embodiment, biaxial scanner 116 uses X- and Y-drivers 134, 136 to vary x- and y-deflections $\gamma_x$, $\gamma_y$ in a periodic fashion as follows:

$$(\gamma_x,\gamma_y)=(A \sin \omega_x t, B \sin(\omega_y t+\Delta)). \quad (Eq. 23)$$

In this equation Δ is the phase difference between x-deflection $\gamma_x$ and y-deflection $\gamma_y$ and A and B are deflection amplitudes in degrees. The instantaneous value of σ(t) is obtained by substituting from equation 17 as follows:

$$\sigma(t)=(\sigma_x,\sigma_y)=(\mu+2A \sin \omega_x t, 2B \sin(\omega_y t+\Delta)). \quad (Eq. 24)$$

A person skilled in the art will recognize that equation 24 represents a general parametric formulation of a Lissajous figure and scan pattern 142' is thus a Lissajous figure. Note that unlike scan line 142, Lissajous figure 142' is not confined to plane Σ. Thus, object 110 has a detection unit 140' that admits scattered portion 139 returning at scatter angle τ to axis C.A. from all azimuthal directions (directions about axis C.A.) rather than only in plane Σ as indicated in dashed lines.

In this embodiment, as inclination angle η changes, the points on Lissajous figure 142' from which scattered portion 139 is admitted into detector 140 change. Note that these points change their azimuthal positions. Thus, the use of Lissajous figure 142' provides additional azimuthal information that can be used in determining Euler angles θ, ψ from inclination angle η.

Figure 12:
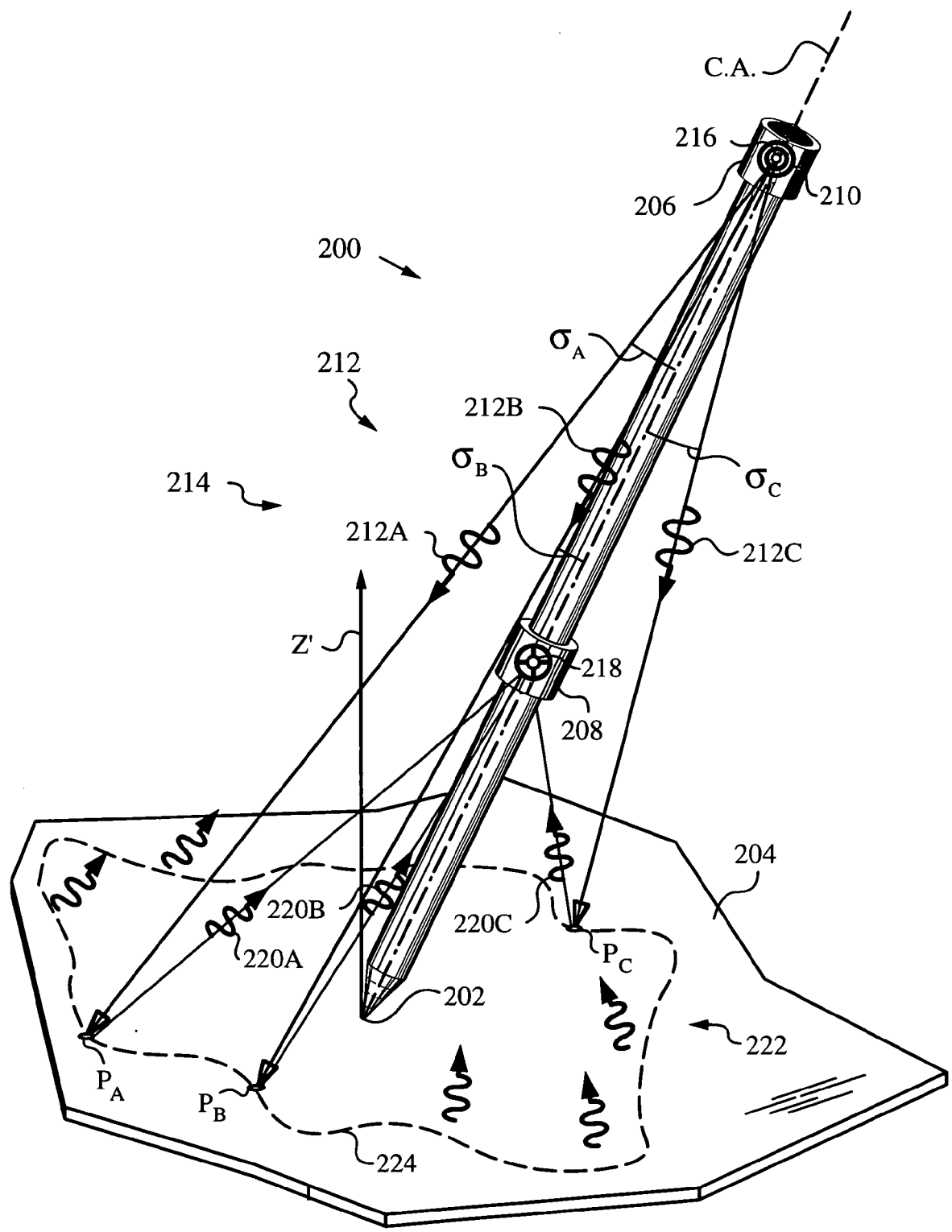
FIG. 12 is an isometric view of another embodiment of an elongate object.

FIG. 12 illustrates another embodiment of an elongate object 200 with a tip 202 contacting a plane surface 204. Elongate object 200 is equipped with a projector 206 and a detector 208. Projector 206 has a light source 210 for illuminating surface 204 with a probe radiation 212 in a pattern 214 from a first point of view 216. Projector 206 is mounted at the top end of object 200 such that point of view 216 is on a center axis C.A. of elongate object 200.

Projector 206 has a structured light optic for projecting probe radiation 212 in a 3-dimensional radiation pattern 214 in space. Any type of optic including holographic elements, diffractive elements, refractive elements and reflective elements can be used. The element or elements making up the optic can be fixed or they can move, depending on pattern 214 to be projected. For example, if pattern 214 is not supposed to change in time, then no moving parts are necessary. On the other hand, if pattern 214 is supposed to vary in time, then moving parts, such as rotating, swiveling or tilting stages or other well-known devices can be used for mounting the structured light optic. In the present embodiment, pattern 214 is an asymmetric pattern.

Detector 208 has a second point of view 218 and is mounted at a known height on object 200. Detector 208 detects a scattered portion 220 of probe radiation 212 returning from surface 204 to second point of view 218. Scattered portion 220 returns in a pattern 222 that is dictated by the shape of a feature 224 that is produced when pattern 214 of probe radiation 212 illuminates surface 204. In the present embodiment, pattern 214 is asymmetric and thus produces asymmetric feature 224. Furthermore, the shape of 3-dimensional radiation pattern 214 is not varied in time in this embodiment. For reasons explained above, a change in inclination angle η or, equivalently, in any of last two Euler angles θ, ψ affects the shape of feature 224 and hence alters radiation pattern 222.

Figure 13:
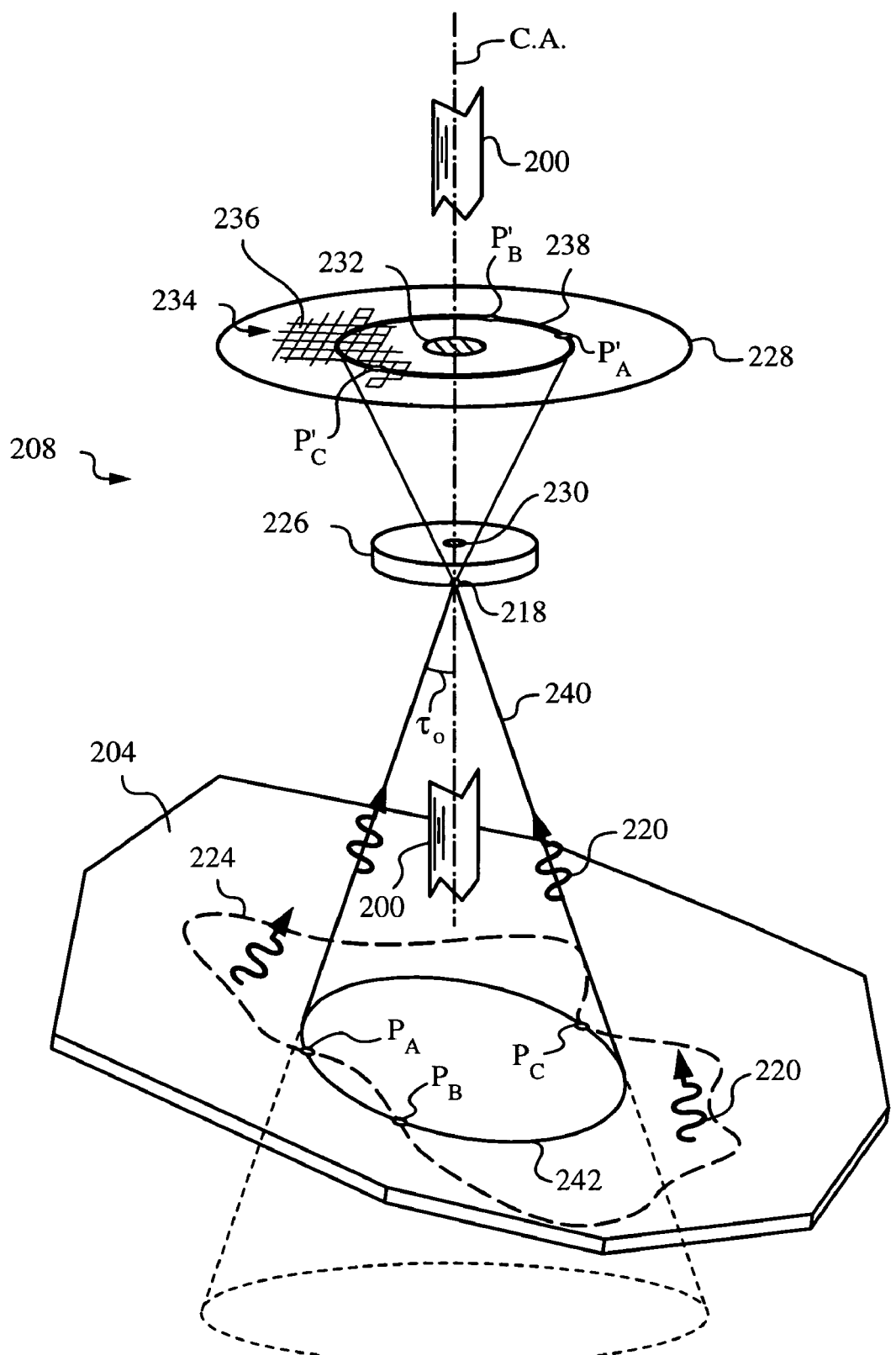
FIG. 13 is a partial three-dimensional view illustrating the detector of the elongate object shown in FIG. 12 in detail.

The parts of detector 208 include an imaging optic 226 that defines second point of view 218 and an image plane 228, as better shown in FIG. 13. A central occlusion 230 of the image in optic 226 and a corresponding shadow 232 cast in image plane 228 are due to central obscuration by object 200. An imaging array 234 having a number of pixels 236 is positioned in image plane 228 for recording scattered portion 220 of probe radiation 212 imaged by optic 226.

Any scattered portion 220 entering detector 208 at scatter angle $\tau_o$ to center axis C.A. has to propagate along the surface of a cone 240 whose surface defines all possible scattering points for probe radiation 212 yielding scatter angle $\tau_o$. The intersection of cone 240 and surface 204 indicates a locus 242 of points on surface 204 at which probe radiation 212 produces scattered portion 220 that returns to object 200 and enters detector 208 at scatter angle $\tau_o$. Note that locus 242 is circular when inclination angle $\eta$ is zero and elliptical otherwise. A circle 238 corresponding to scattered portion 220 returning at scatter angle $\tau_o$ from any point of locus 242 is indicated on imaging array 234 in image plane 228.

During operation pattern 224 is projected by projector 206 on surface 204 and produces feature 224. Scattered portion 220 returns to detector 208 and is imaged onto array 234. Of all probe radiation 212 probe radiation rays 212A, 212B, 212C projected at angles $\sigma_A$, $\sigma_B$, $\sigma_C$ to axis C.A. illuminate surface 204 at points $P_A$, $P_B$, $P_C$ respectively. Since points $P_A$, $P_B$, $P_C$ belong to locus 242 scattered portion rays 220A, 220B, 220C from points $P_A$, $P_B$, $P_C$ return at scatter angle $\tau_o$ to axis C.A. and are imaged on circle 238. Therefore, circle 238 defines a narrow-field angle, namely scatter angle $\tau_o$.

Since pattern 214 is known, knowledge of points generated by scattered portion 220 on circle 238, specifically, points $P'_A$, $P'_B$ and $P'_C$ is sufficient to determine at least one orientation parameter of object 200, namely angle $\eta$. Furthermore, angle $\eta$ can be resolved into Euler angles $\theta$, $\psi$ based on the locations of points $P'_A$, $P'_B$, $P'_C$ on circle 238. Note that in many cases two distinct points on circle 238 will be sufficient to determine Euler angles $\theta$, $\psi$. The actual determination of the at least one orientation parameter is performed by a processing unit (not shown) in communication with imaging array 234. As before, look-up tables as well as other known techniques can be employed to make the determination efficient. It should also be noted that pattern 214 can vary, and rather than being projected all at once by projector 206 it can also be scanned by any suitable scanning arrangement including one or more uniaxial and/or biaxial scanners or any suitable combination thereof. In another version of this embodiment, in order to reduce the number of pixels 236, imaging array 234 may only have pixels 236 arranged along the circumference of circle 238.

Figure 14:
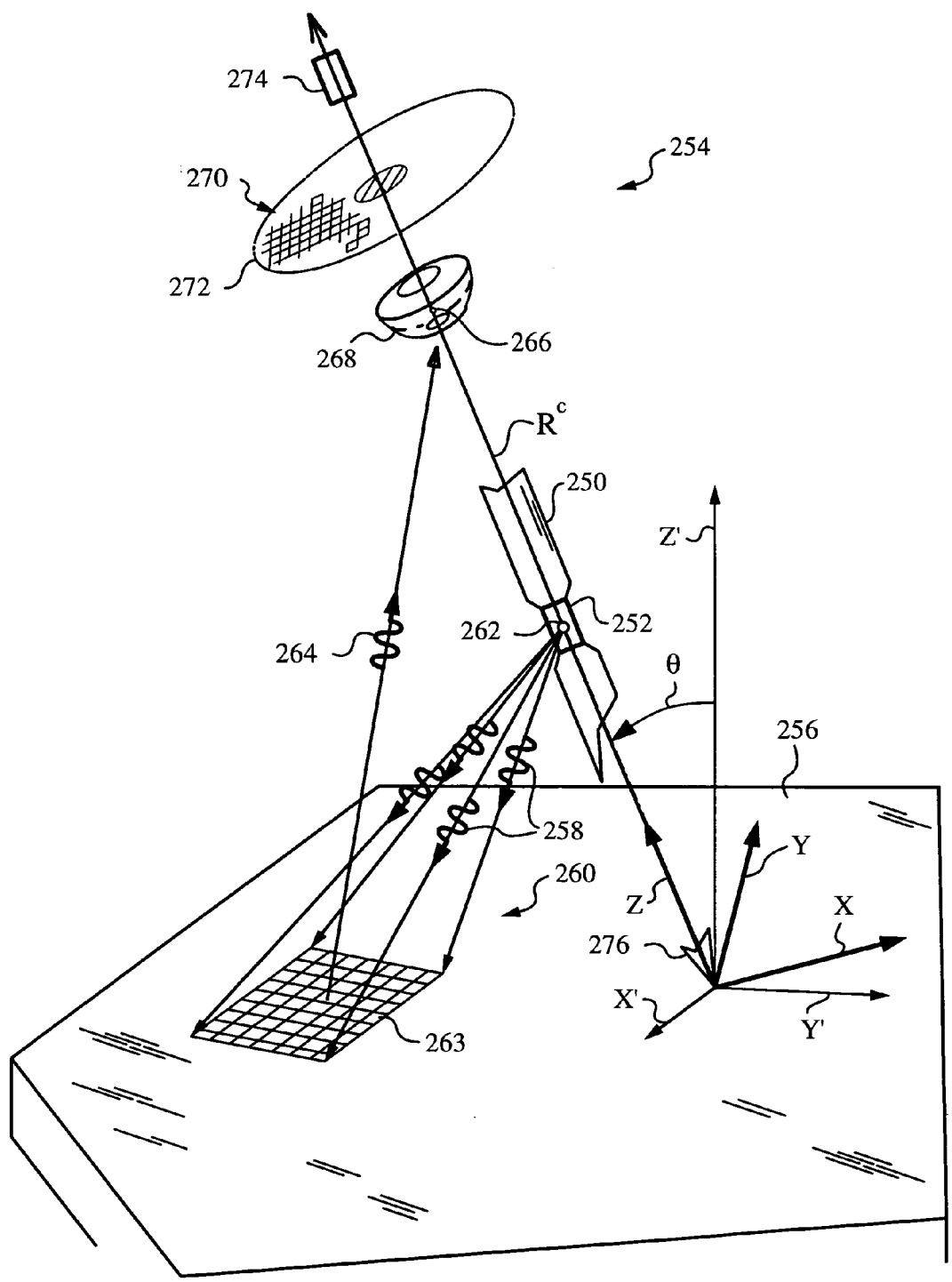
FIG. 14 is a partial schematic view of yet another embodiment of an elongate object having its projector mounted below the detector.

FIG. 14 shows a partial and schematic view yet another embodiment of an elongate object 250 with a projector 252 mounted below a detector 254. Object 250 is shown only partially and is generally indicated by vector $R^c$ for reasons of clarity. Projector 252 illuminates a surface 256 with a probe radiation 258 in a grid pattern 260 from a first point of view 262. Projector 252 can be of any suitable type and grid pattern 260 can be either projected continuously, periodically, intermittently and/or in portions or it can be scanned out in any order, e.g., in a line or raster scan. In any event, when projected on surface 256, pattern 260 is deformed as a function of inclination angle $\eta$ to form a feature 263.

Detector 254 detects a scattered portion 264 of probe radiation 258 returning from feature 263 on surface 256 to a second point of view 266. Second point of view 266 is defined by a lens 268 belonging to detector 254. Detector 254 also has an imaging array 270 disposed in an image plane 272 defined by lens 268. A unit 274 for determining at least one orientation parameters from a difference between probe radiation 258 and scattered portion 264 is in communication with imaging array 270.

Object 250 can be a jotting implement such as a pen, pencil or a stylus. In a preferred embodiment object 250 is a pen and surface 256 is a paper surface.

During operation a tip 276 of object 250 contacts surface 256 and projector 252 projects grid pattern 260 onto surface 256. The orientation of object 250, and more specifically the last two Euler angles $\theta$, $\psi$ cause grid pattern 260 to be deformed into feature 263. Observation of feature 263 with the aid of imaging array 270 and from second point of view 266 afforded by lens 268 enables recovery of Euler angles $\theta$, $\psi$ by any of the above-discussed techniques. In addition, the use of grid pattern 260 allows one to recognize the topology of surface 256. For example, grid pattern 260 is projected onto surface 256 while Euler angles $\theta$, $\psi$ are zero for calibration of the surface topology. Later, the surface topology is taken into account when deriving Euler angles $\theta$, $\psi$ at various poses of object 250. Thus, surface 256 does not need to be a planar surface in this embodiment. For more information on the use of grids in determining surface orientation the reader is referred to Wang, Y. F., Mitiche, A., and Aggarwal, J. K., "Computation of Surface Orientation and Structure of Objects Using Grid Coding", PAMI(9), No. 1, January 1987, pp. 129–137; Shrikhande, N., and Stockman, G. C., "Surface Orientation from a Projection Grid", PAMI (11), No. 6, June 1989, pp. 650–655.

It should be noted that the points of view of the projector and detector can be placed in any relationship to each other and each system can have more than one point of view. The same is true for employing scanning, since many scan arms with separate scan mirrors defining their respective points of view can be employed. Furthermore, the detector can use any type of photodetector, including a single photodetector rather than an array.

It will be evident to a person skilled in the art that the present invention admits of various other embodiments.

The invention claimed is:

1. An apparatus for determining at least one orientation parameter of an elongate object having a tip contacting a surface at a contact point, said apparatus comprising:
   a) a projector on said elongate object for illuminating said surface with a probe radiation in a predetermined pattern from a first point of view;
   b) a detector on said elongate object for detecting a scattered portion of said probe radiation returning from said surface to a second point of view;
   c) a unit for determining said at least one orientation parameter from a difference between said probe radiation and said scattered portion.

2. The apparatus of claim 1, wherein said at least one orientation parameter comprises an inclination angle $\theta$ between an axis of said elongate object and a normal to said surface at said contact point.

3. The apparatus of claim 2, wherein said at least one orientation parameter further comprises a roll angle $\psi$ around said axis.

4. The apparatus of claim 1, wherein said surface comprises a plane surface.

5. The apparatus of claim 1, wherein said predetermined pattern comprises an asymmetric pattern.

6. The apparatus of claim 5, wherein said asymmetric pattern is selected from the group consisting of line sets, ellipses, rectangles and polygons.

7. The apparatus of claim 1, wherein said projector comprises a structured light optic for projecting said probe radiation onto said plane surface in said predetermined pattern.

8. The apparatus of claim 7, wherein said structured light optic comprises at least one element selected from the group consisting of holographic elements, diffractive elements, refractive elements and reflective elements.

9. The apparatus of claim 1, wherein said elongated object is selected from the group consisting of jotting implements, pointers, robotic arms and canes.

10. The apparatus of claim 9, wherein said jotting implements are selected from the group consisting of pens, pencils and styluses.

11. An apparatus for determining at least one orientation parameter of an elongate object having a tip contacting a plane surface, and a normal to said plane surface, said apparatus comprising:
  a) a projector on said elongate object for illuminating said plane surface with a probe radiation at an angle σ to an axis of said elongate object;
  b) a detector on said elongate object offset from said projector for detecting a scattered portion of said probe radiation returning from said plane surface at a predetermined scatter angle τ to said axis;
  c) a timing unit for deriving said at least one orientation parameter from a detection time of said scattered portion.

12. The apparatus of claim 11, wherein said at least one orientation parameter comprises an inclination angle θ between said axis of said elongate object and a normal to said surface at said contact point.

13. The apparatus of claim 12, wherein said at least one orientation parameter further comprises a roll angle ψ around said axis.

14. The apparatus of claim 11, further comprising a scanning arrangement for varying said angle σ in a scan pattern.

15. The apparatus of claim 14, wherein said scanning arrangement comprises a uniaxial scanner for varying said angle σ by introducing an x-deflection $\gamma_x$.

16. The apparatus of claim 14, wherein said scanning arrangement comprises a biaxial scanner for varying said angle σ by introducing an x-deflection $\gamma_x$ and a y-deflection $\gamma_y$.

17. The apparatus of claim 14, wherein said scanning arrangement comprises a biaxial scanner for varying said angle σ and said scan pattern is selected from the group consisting of raster scan patterns, line scan patterns and Lissajous figures.

18. The apparatus of claim 11, wherein said projector comprises a structured light optic for projecting said probe radiation onto said plane surface in a predetermined pattern.

19. The apparatus of claim 18, wherein said structured light optic comprises at least one element selected from the group consisting of holographic elements, diffractive elements, refractive elements and reflective elements.

20. The apparatus of claim 18, wherein said predetermined pattern is selected from the group consisting of line sets, ellipses, rectangles and polygons.

21. The apparatus of claim 11, wherein said projector is mounted above said detector.

22. The apparatus of claim 11, wherein said detector further comprises a narrow field angle reception unit for admitting to said detector only said scattered portion returning from said plane surface at said predetermined scatter angle τ.

23. The apparatus of claim 22, wherein said narrow field angle reception unit is selected from the group consisting of a cylindrical lens, a collimating lens, a thick aperture, a system of apertures, and a slit.

24. The apparatus of claim 11, wherein said detector comprises a photodetector array.

25. The apparatus of claim 24, further comprising a centroid computation unit for determining a centroid of said scattered portion.

26. The apparatus of claim 11, further comprising an optic for shaping said probe radiation into a scan beam.

27. The apparatus of claim 11, wherein said elongated object is selected from the group consisting of jotting implements, pointers, robotic arms and canes.

28. The apparatus of claim 27, wherein said jotting implements are selected from the group consisting of pens, pencils and styluses.

29. The apparatus of claim 11, wherein said timing unit is located on said elongate object.

30. The apparatus of claim 11, wherein said projector comprises a single frequency emitter for emitting said probe radiation at a single frequency f.

31. A method for determining at least one orientation parameter of an elongate object having a tip contacting a surface at a contact point, said method comprising:
  a) illuminating said surface with a probe radiation in a predetermined pattern from a first point of view on said elongate object;
  b) detecting a scattered portion of said probe radiation returning from said surface at a second point of view on said elongate object;
  c) determining said at least one orientation parameter from a difference between said probe radiation and said scattered portion.

32. The method of claim 31, wherein said predetermined pattern is a scan pattern.

33. The method of claim 31, wherein said predetermined pattern comprises an asymmetric pattern.

34. The method of claim 31, wherein said at least one orientation parameter comprises at least one Euler angle.

35. A method for determining an inclination angle θ between an axis of an elongate object having a tip contacting a plane surface, and a normal to said plane surface, said method comprising:
  a) providing a projector on said elongate object;
  b) providing a detector on said elongate object, said detector being offset from said projector;
  c) illuminating said plane surface with a probe radiation at an angle σ to said axis from said projector;
  d) detecting a scattered portion of said probe radiation returning from said plane surface at a predetermined scatter angle τ to said axis with said detector;
  e) a timing unit for deriving said inclination angle θ from a detection time of said scattered portion.

36. The method of claim 35, wherein said angle σ is varied in a scan pattern.

37. The method of claim 36, wherein said scan pattern is selected from the group of uniaxial scan patterns and biaxial scan patterns.

* * * * *